US012522647B2

(12) United States Patent
Meger et al.

(10) Patent No.: US 12,522,647 B2
(45) Date of Patent: Jan. 13, 2026

(54) BETA-ARRESTIN MUTANTS

(71) Applicants: PAUL SCHERRER INSTITUT, Villigen PSI (CH); INTERAX BIOTECH AG, Villigen (CH)

(72) Inventors: Benoit Meger, Windisch (CH); Martin Konrad Ostermaier, Waldshut-Tiengen (DE); Philipp Berger, Oberbuchsiten (CH); Mirjam Zimmermann, Basel (CH); Maria Waldhoer, Zurich (CH)

(73) Assignees: Paul Scherrer Institut, Villigen PSI (CH); INTERAX BIOTECH AG, Villigen (CH)

( * ) Notice: Subject to any disclaimer, the term of this patent is extended or adjusted under 35 U.S.C. 154(b) by 972 days.

(21) Appl. No.: 17/425,095

(22) PCT Filed: Jan. 21, 2020

(86) PCT No.: PCT/EP2020/051394
§ 371 (c)(1),
(2) Date: Jul. 22, 2021

(87) PCT Pub. No.: WO2020/152152
PCT Pub. Date: Jul. 30, 2020

(65) Prior Publication Data
US 2022/0106382 A1     Apr. 7, 2022

(30) Foreign Application Priority Data
Jan. 22, 2019   (EP) ..................................... 19153159

(51) Int. Cl.
C07K 14/72      (2006.01)
(52) U.S. Cl.
CPC ................... C07K 14/723 (2013.01)
(58) Field of Classification Search
None
See application file for complete search history.

(56) References Cited

U.S. PATENT DOCUMENTS

| | | | |
|---|---|---|---|
| 7,235,374 B2 | 6/2007 | Palmer et al. | |
| 7,867,973 B2 | 1/2011 | Tsuchida et al. | |
| 8,790,933 B2 | 7/2014 | Weir et al. | |
| 8,926,988 B2 | 1/2015 | Rosa Calatrava et al. | |
| 10,584,159 B2 | 3/2020 | Laporte et al. | |
| 11,401,321 B2 | 8/2022 | Ostermaier et al. | |
| 2006/0246507 A1 | 11/2006 | Heding | |
| 2018/0251847 A1 | 9/2018 | Agrawal et al. | |

FOREIGN PATENT DOCUMENTS

| | | |
|---|---|---|
| CN | 1724657 A | 1/2006 |
| CN | 1970074 A | 5/2007 |
| CN | 1993463 A | 7/2007 |
| CN | 102282267 A | 12/2011 |
| CN | 105593240 A | 5/2016 |
| CN | 107533049 A | 1/2018 |
| EP | 2235533 A2 | 10/2010 |
| EP | 2924125 A1 | 9/2015 |
| JP | 2013253024 A | 12/2013 |
| JP | 2016526664 A | 9/2016 |
| WO | 0158923 A2 | 8/2001 |
| WO | 2014155022 A1 | 10/2014 |
| WO | 2014198528 A2 | 12/2014 |

OTHER PUBLICATIONS

Martin K. Ostermaier et al: "Functional map of arrestin-1 at single amino acid resolution", Proceedings of the National Academy of Sciences of the United States of America, vol. 111, No. 5, Jan. 21, 2014 (Jan. 21, 2014), pp. 1825-1830, XP055577034, ISSN: 0027-8424, DOI: 10.1073jpnas. 1319402111 the whole document table 1.
Christian Peterhans et al: "Functional map of arrestin binding to phosphorylated opsin, with and without agonist", Scientific Reports, vol. 6, No. 1, Jun. 28, 2016 (Jun. 28, 2016), XP055577036, DOI: 10.1038jsrep28686 the whole document table 1.
Joel A. Hirsch et al: "A Model for Arrestin's Regulation: The 2.8 A Crystal Structure of Visual Arrestin", CELL, vol. 97, No. 2, Apr. 16, 1999 (Apr. 16, 1999), pp. 257-269, XP055088189, ISSN: 0092-8674, DOI: 10.1016/0092-8674 (00) 80735-7 figure 4.
Dawei Sun et al: "Probing G[alpha]i1 protein activation at single-amico acid resolution"; Nature Structural and Molecular Biology; Sep. 22, 2015(9); pp. 686-694 doi: 10.1038/nsmb.3070. Epub Aug. 10, 2015.
Xiang, Liu Yi et al.; "β-arrestins and their progression of research"; International Respiratory Journal, Jun. 2011, vol. 31,No. 11.

*Primary Examiner* — Marsha Tsay
(74) *Attorney, Agent, or Firm* — Laurence A. Greenberg; Werner H. Stemer; Ralph E. Locher

(57) ABSTRACT

The invention relates to the field of arrestin mutants, especially mutants of beta-arrestin, a complex of the mutant beta-arrestin and a G-protein-coupled receptor (GPCR), and a vector encoding the mutant beta-arrestin.

15 Claims, 3 Drawing Sheets

Specification includes a Sequence Listing.

FIG. 4

BETA-ARRESTIN MUTANTS

BACKGROUND OF THE INVENTION

Field of the Invention

The present invention relates to the field of arrestin mutants, especially mutants of beta-arrestin, a complex of the mutant beta-arrestin of the invention and a GPCR, and a vector encoding the mutant beta-arrestin of the invention.

RELATED ART

G protein-coupled receptors (GPCRs) are a family of membrane receptors that mediate transmembrane signaling through G proteins. In response to stimuli, GPCRs activate G proteins to regulate the generation of second messengers, which then modulate down-stream signaling effectors. To turn off the signaling responses, GPCR kinases (GRKs) are recruited to phosphorylate the GPCR and prepare it for arrestin binding. Arrestin binding blocks G protein-mediated signaling and can direct the receptor to the internalization pathway. Upon binding to GPCRs, arrestins also serve as scaffolds that orchestrate the GPCR signaling network (Zhou et al., 2017, Identification of Phosphorylation Codes for Arrestin Recruitment by G Protein-Coupled Receptors, Cell 170, pp. 457-469). It is suggested that distinct conformations of GPCR-arrestin complexes interact with GPCRs to desensitize G protein and to mediate receptor endocytosis (Cahill et al., Distinct conformations of GPCR-β-arrestin complexes mediate desensitization, signaling, and endocytosis, PNAS 114(10), pp. 2562-2567).

Arrestins form a small family of proteins that includes several subtypes, such as arrestin-1, also called visual arrestin, S-antigen or 48-kDa protein; arrestin-2, also called β-arrestin 1; arrestin-3, also called β-arrestin 2; and arrestin-4, also called cone arrestin or X-arrestin. Arrestin-1 was the first arrestin to be discovered and was named visual arrestin for its pivotal role in phototransduction. β-arrestins (beta-arrestins) are cytosolic adaptor proteins that exist as two distinct isoforms, referred to as β-arrestin 1 (encoded by the ARRB1 gene) and β-arrestin 2 (encoded by the ARRB2 gene). More recently, another subtype of arrestins has been identified, referred to as α-arrestins. They are structurally similar to their visual/cone and β-arrestin counterparts and have been proposed to regulate lipolysis and the pathogenesis of obesity (Ahmadzai et al., Canonical and Noncanonical Signaling Roles of β-Arrestins in Inflammation and Immunity, Advances in Immunology 136, pp. 279-313).

Potter et al., 2002 (Arrestin Variants Display Differential Binding Characteristics for the Phosphorylated N-Formyl Peptide Receptor Carboxyl Terminus, J Biol Chem 277(11), pp. 8970-8978, 2002) examined interactions of various members of the arrestin family with the formyl peptide receptor (FPR), a member of the GPCR family of receptors. Arrestin-2 and arrestin-3, but not arrestin-1, bound to the FPR carboxyl-terminal peptide in a phosphorylation-dependent manner. Truncated arrestin-2 (1-382) and arrestin-3 (1-393) display phosphorylation-independent binding to intact receptors. Two additional mutants of arrestin-2 were evaluated for their binding affinity to the FPR carboxyl-terminus. Whereas the single point mutant, arrestin-2 R169E, displayed an affinity similar to that of the full-length arrestins, the triple point mutant, arrestin-2 I386A/V387A/F388A, displayed an affinity more similar to that of the truncated forms of arrestin for binding to the FPR carboxyl-terminus.

SUMMARY OF THE INVENTION

The inventors designed beta-arrestin mutants, which show increased recruitment of ligands to GPCRs, especially the β2-adrenergic receptor (β2AR), as demonstrated in a cell-based Bioluminescence Resonance Energy Transfer (BRET) assay. Compared to wild-type (WT) arrestin-3, recruitment by arrestin-3 mutants of the invention is increased by at most 30%.

Furthermore, the beta-arrestin mutants of the invention function as bio sensors and are capable of sensing β2AR isoproterenol-activated conformation in the cell in a more sensitive manner compared to WT beta-arrestin mutants. Beta-arrestin mutants of the invention, especially arrestin-3 mutants, can recognize a lower amount of activated receptors in a cell compared to WT arrestin-3 (higher potency) and exhibit up to a 30% increase in maximum signal detected when using the highest concentration of β2AR agonist (higher efficacy).

Besides, by comparing the relative reactivity of the beta-arrestin mutants of the invention to a GPCR, different conformational states can be discriminated in a BRET assay. The BRET assay allows a kinetic measurement of arrestin recruitment and because GPCR conformations are transitioning via equilibrium, the beta-arrestin mutants of the invention are therefore suited to monitor such changes. By making arrestin less sensitive to the phosphorylated carboxy-terminus of the GPCR upon stimulation, the beta-arrestin mutants of the invention, especially via a mutation at an amino acid position which corresponds to I386 and T299 in human arrestin-3 of SEQ ID NO: 1, also allows to sense phosphorylation-independent conformations of the receptor.

Moreover, expression levels in cells of the beta-arrestin mutants of the invention were monitored (e.g. by using a reporter protein such as fused Green Fluorescent Protein (GFP)). Despite a consistent lower expression of the arrestin-3 mutants in human HEK293 cells (ranging from 26% to 55% compared to WT arrestin-3), a stronger recruitment to β2AR was still observed. Taking this factor into account, the inventors predict that the actual strength of the protein-protein interaction of the arrestin-3 mutant of the invention should exceed the experimental values given by the BRET assay.

Thus, in a first aspect, the present invention provides for a mutant beta-arrestin in which independently at least two amino acids are mutated as compared to a parent beta-arrestin, wherein said parent beta-arrestin is a naturally occurring beta-arrestin, and wherein the first of said at least two mutated amino acids is located at an amino acid position which corresponds to I386 in human arrestin-3 of SEQ ID NO: 1, and wherein the second of said at least two mutated amino acids is located at an amino acid position which corresponds to T299 in human arrestin-3 of SEQ ID NO: 1.

In a further aspect, the present invention provides for a complex of a mutant beta-arrestin and a GPCR, wherein preferably said GPCR is a β2-adrenergic receptor (β2AR).

In a further aspect, the present invention provides for a vector encoding the beta-arrestin of the invention.

In a further aspect, the present invention provides for use of the mutant beta-arrestin of the invention or the complex of the invention for structure elucidation of said complex or said GPCR of said complex.

In a further aspect, the present invention provides for a use of the mutant beta-arrestin of the invention or the complex of the invention for drug screening, wherein recruitment of the arrestin-3 mutant to the GPCR is measured.

BRIEF DESCRIPTION OF THE SEVERAL VIEWS OF THE DRAWING

FIG. 4: Sequence alignment of the two isoforms arrestin-2 (ARRB2 HUMAN) and arrestin-3 (ARRB1_HUMAN. Dark grey: identical residues; light grey: similar residues in respect to polarity and size of the side chains; no highlight: different residues; "-": insertion in other sequence. Overall 73.47% homology was found among all sequences with 313 identical, 63 similar and 33 different residues. The analysis was performed with the program clustal-omega with default transition matrix Gonnet and the HHalign algorithm in its default setting as described in Söding, J. et al., Protein homology detection be HMM-HMM comparison, Bioinformatics 21, pp. 951-960.

DETAILED DESCRIPTION OF THE INVENTION

Unless defined otherwise, all technical and scientific terms used herein have the same meanings as commonly understood by one of ordinary skill in the art to which this invention belongs.

Throughout this specification and the claims which follow, unless the context requires otherwise, the word "comprise" or the word "include", and variations such as "comprises/includes" and "comprising/including", are to be understood to imply the inclusion of an element, stated integer, step or a group thereof but not the exclusion of any other element, stated integer, step or a group thereof.

As used in this specification and the appended claims, the singular forms "a", "an", and "the" include plural referents, unless the content clearly dictates otherwise.

The term "about" or "approximately" when used in connection with a numerical value is meant to encompass numerical values within a range having a lower limit that is 0-10% smaller than the indicated numerical value and having an upper limit that is 0-10% larger than the indicated numerical value. The term "about" or "approximately" means preferably ±10%, more preferably ±5%, again more preferably ±3% or most preferably ±0% (referring to the given numeric value, respectively). In each of the invention embodiments, "about" can be deleted. All ranges of values disclosed herein, should refer and include to any and all values falling within said range including the values defining the range.

The term "naturally occurring" as used herein refers to a sequence of natural origin which means that the whole or parts thereof are not synthetic and exist or are produced in nature. More preferably, the term "naturally occurring" as used herein refers to a sequence of natural origin which means that the whole sequence is are not synthetic and exists or is produced in nature.

The term "beta-arrestin" preferably comprises arrestin-2 (β-arrestin 1) and arrestin-3 (β-arrestin 2). More preferably, the term "beta-arrestin" refers to arrestin-2 and arrestin-3 only. The term "beta-arrestin" includes full and truncated beta-arrestin. Typically and preferably, the terms arrestin-2 and arrestin-3 refer to canonical sequences.

The term "mutated", "mutation and "mutant" are interchangeably used herein. Typically and preferably, said a mutated amino acid or a mutation is an exchange of one amino acid by one or more amino acids, an insertion, a deletion or a combination thereof. Most preferably, said a mutated amino acid or mutation is an exchange of a single amino acid by a different single amino acid.

A mutated or mutant beta-arrestin is mutated as compared to a parent beta-arrestin, wherein said parent beta-arrestin is typically and preferably a naturally occurring beta-arrestin. A mutated or mutant arrestin-3 is mutated as compared to a parent beta-arrestin, wherein said parent beta-arrestin is typically and preferably a naturally occurring arrestin-3.

Figure 3:
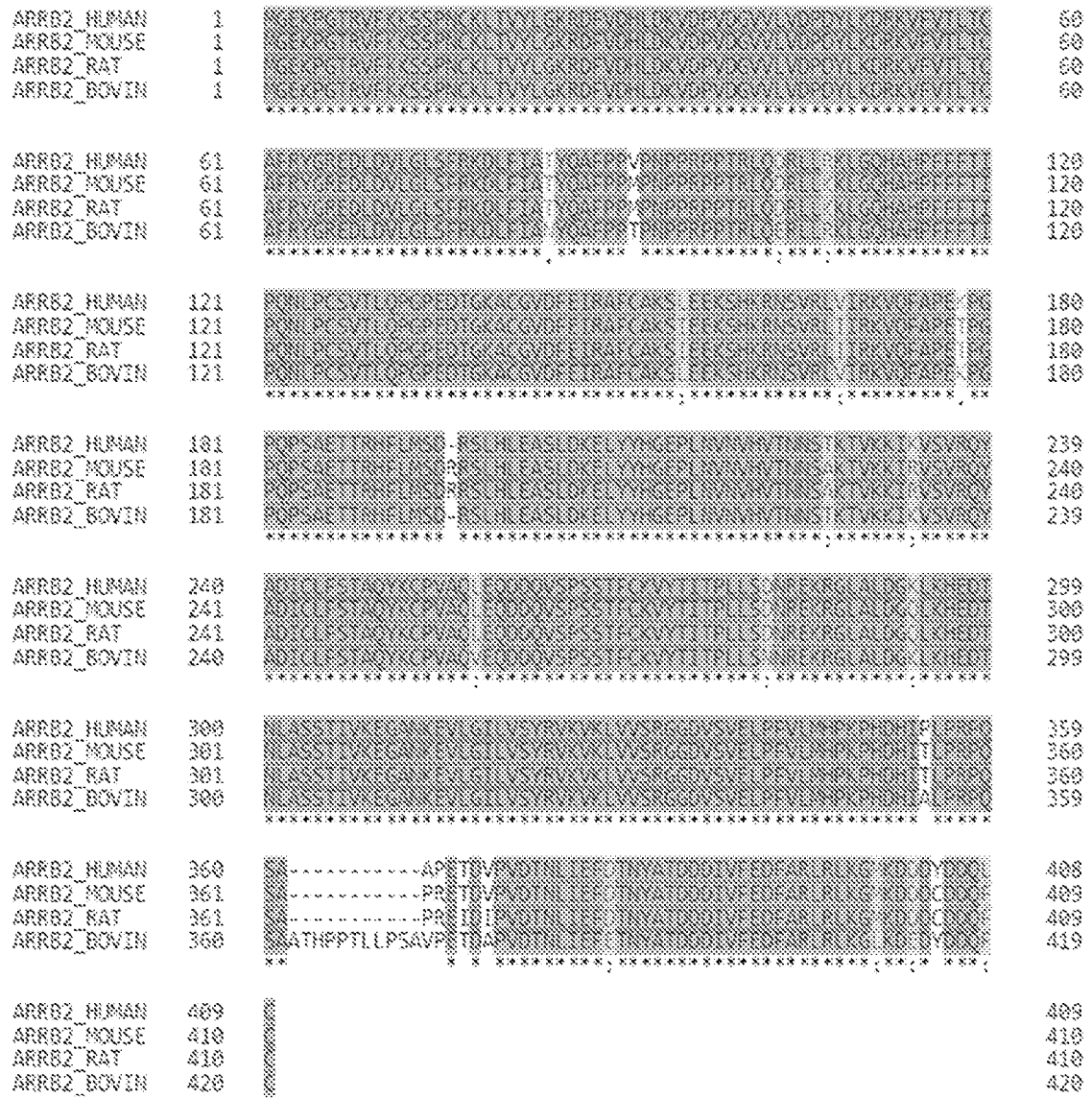
FIG. 3: Sequence alignment of human wild-type arrestin-3 (ARRB2_HUMAN) to mouse, rat and bovine homologous arrestin-3 proteins. Dark grey: identical residues; light grey: similar residues in respect of polarity and size of the side chains; no highlight: different residues; "-": insertion in other sequence. Overall a very high homology (91.92%) was found among all sequences with 387 identical, 15 similar and 7 different residues. The analysis was performed with the program clustal-omega with default transition matrix Gonnet and the HHalign algorithm in its default setting as described in Söding, J. et al., Protein homology detection be HMM-HMM comparison, Bioinformatics 21, pp. 951-960.
Figure 4:
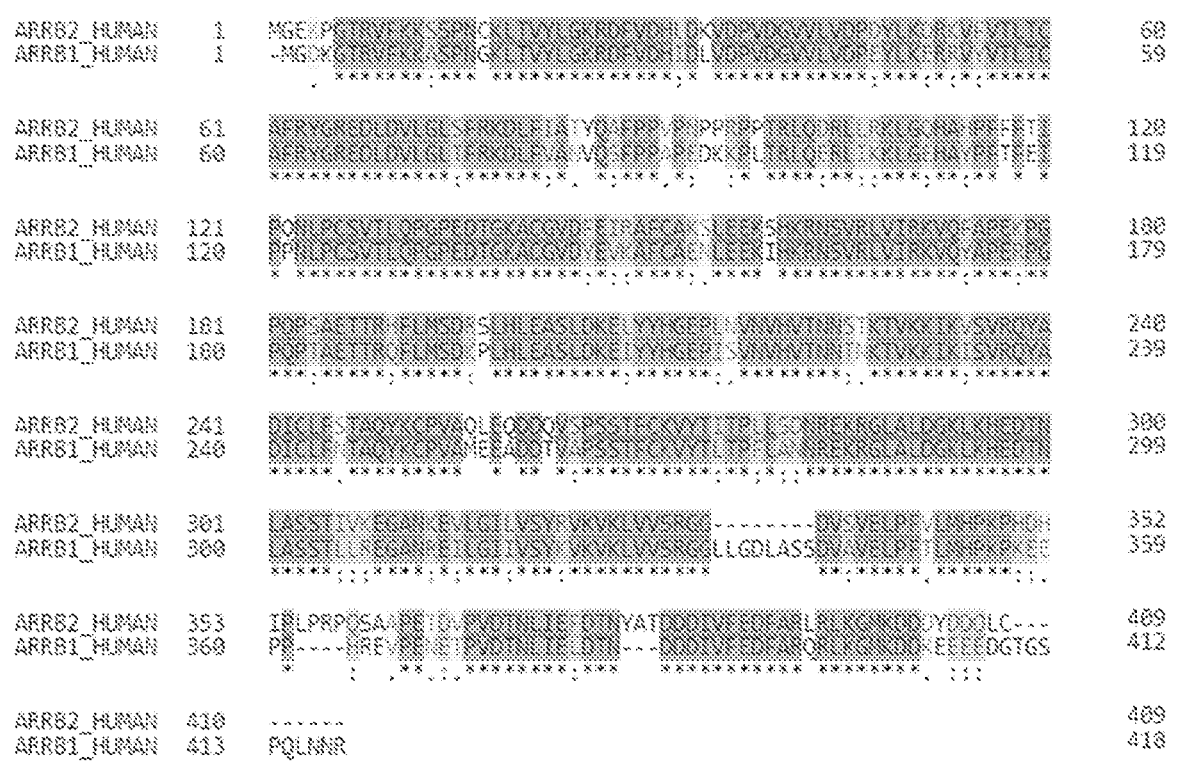

Amino acid positions of arrestin-3 are aligned (or mapped) herein to human arrestin-3 (SEQ ID NO: 1), preferably by structural alignment. As used herein, the expression "corresponding amino acid residue" or an "amino acid position corresponds to" refers to an amino acid residue in beta-arrestin which aligns to the given amino acid residue in human arrestin-3 of SEQ ID NO: 1. Typically and preferably the structural alignment is performed using the software PyMOL, Molecular Graphics System, Version 2.0 Schrödinger, LLC built-in alignment algorithm. Typically and preferably the alignment is a structural alignment. An example of such an alignment based on bovine arrestin-3 is explained in Zhan, X. et al., 2011 ("Crystal Structure of Arrestin-3 Reveals the Basis of the Difference in Receptor Binding Between Two Non-visual Subtypes", J. Mol. Biol. 406(3), pp. 467-478) (Swiss-model) and also shown in FIGS. 2, 3 and 4 of this application. Typically and preferably the alignment is carried out using protein-protein BLAST using standard algorithm parameters. Preferred standard parameters are threshold 10, word size 3, Matrix BLOSUM62, gap costs Existence 11/Extension 1, conditional compositional score matrix adjustments, no filters and masking.

The term "G protein-coupled receptor" (GPCR) refers typically and preferably to receptors of Class A (or 1) (Rhodopsin-like), Class B (or 2) (Secretin receptor family), Class C (or 3) (Metabotropic glutamate/pheromone), Class D (or 4) (Fungal mating pheromone receptors), Class E (or 5) (Cyclic AMP receptors), Class F (or 6) (Frizzled/Smoothened). More preferably a GPCR is a Rhodopsin-like receptor, more preferably a Rhodopsin-like receptor of subfamily A17. More preferably, said GPCR is an adrenergic receptor. Said adrenergic receptor typically and preferably includes Alpha1A (ADRA1A, A1AA), Alpha1B (ADRA1B, A1AB), Alpha1D (ADRA1D, A1AD), Alpha2A (ADRA2A, A2AA), Alpha2B (ADRA2B, A2AB), Alpha2C (ADRA2C, A2AC), Beta1 (ADRB1, B1AR), Beta2 (ADRB2, B2AR), Beta3 (ADRB3, B3AR). Again more preferably said GPCR is a beta2 adrenergic receptor. Preferably, said beta-2 adrenergic receptor is a canonical naturally occurring human, mouse, rat or bovine beta-2 adrenergic receptor.

In a first aspect, the invention refers to a mutant beta-arrestin in which independently at least two amino acids are mutated as compared to a parent beta-arrestin, wherein said parent beta-arrestin is a naturally occurring beta-arrestin, and wherein the first of said at least two mutated amino acids is located at an amino acid position which corresponds to I386 in human arrestin-3 of SEQ ID NO: 1, and wherein the second of said at least two mutated amino acids is located at an amino acid position which corresponds to T299 in human arrestin-3 of SEQ ID NO: 1.

In a preferred embodiment, said parent beta-arrestin is a naturally occurring arrestin-3. Preferably said naturally occurring arrestin-3 is selected from the group consisting of naturally occurring human, bovine, mouse or rat arrestin-3. More preferably, said parent beta-arrestin is selected from the group consisting of SEQ ID NO: 1 or any one of SEQ ID NO: 7-9, or an amino acid sequence having an identity of 80% to 100% with any one of SEQ ID NO: 1 or any one of SEQ ID NO: 7-9. Again more preferably, said parent beta-arrestin has an amino acid sequence selected from the group consisting of SEQ ID NO: 1 or any one of SEQ ID NO: 7-9.

Preferably, said mutant beta-arrestin of the invention is mutant arrestin-3, in which independently at least two amino acids are mutated as compared to a parent arrestin-3, wherein said parent arrestin-3 is a naturally occurring arrestin-3, and wherein the first of said at least two mutated amino acids is located at an amino acid position which corresponds to I386 in human arrestin-3 of SEQ ID NO: 1, and the second of said at least two mutated amino acids is located at an amino acid position which corresponds to T299 in human arrestin-3 of SEQ ID NO: 1. More preferably, said mutant beta-arrestin of the invention is mutant arrestin-3, in which independently at least two amino acids are mutated as compared to a parent arrestin-3, wherein said parent arrestin-3 is a naturally occurring arrestin-3, and wherein the first of said at least two mutated amino acids is located at an amino acid position which corresponds to I386 in human arrestin-3 of SEQ ID NO: 1, and the second of said at least two mutated amino acids is located at an amino acid position which corresponds to T299 in human arrestin-3 of SEQ ID NO: 1.

In a preferred embodiment, in said mutant beta-arrestin of the invention independently at least two amino acids are mutated as compared to a parent beta-arrestin, wherein said parent beta-arrestin is a naturally occurring beta-arrestin, and wherein the first of said at least two mutated amino acids is located at an amino acid position which corresponds to I386 in human arrestin-3 of SEQ ID NO: 1, and the second of said at least two mutated amino acids is located at an amino acid position which corresponds to T299 in human arrestin-3 of SEQ ID NO: 1, and wherein optionally in said mutant beta-arrestin of the invention, an amino acid is mutated at a third amino acid position. Preferably said parent beta-arrestin is selected from the group consisting of naturally occurring human, bovine, mouse, and rat beta-arrestin, wherein human beta-arrestin arrestin is more preferred. More preferably, said parent beta-arrestin is selected from the group consisting of SEQ ID NO: 1, or any one of SEQ ID NO: 6-12, wherein SEQ ID NO: 1 or 6 is again more preferred.

In a more preferred embodiment, said mutant beta-arrestin of the invention is mutant arrestin-3, wherein independently at least two amino acids are mutated as compared to a parent arrestin-3, wherein preferably said parent arrestin-3 is a naturally occurring arrestin-3, and wherein the first of said at least two mutated amino acids is located at an amino acid position which corresponds to I386 in human arrestin-3 of SEQ ID NO: 1, and the second of said at least two mutated amino acids is located at an amino acid position which corresponds to T299 in human arrestin-3 of SEQ ID NO: 1, and wherein optionally in said mutant beta-arrestin of the invention, an amino acid is mutated at a third amino acid position. Preferably said parent arrestin-3 is selected from the group consisting of naturally occurring human, bovine, mouse, and rat arrestin-3, wherein human arrestin is more preferred. More preferably, said parent arrestin-3 is selected from the group consisting of SEQ ID NO: 1, SEQ ID NO: 7, SEQ ID NO: 8 and SEQ ID NO: 9, wherein SEQ ID NO: 1 is more preferred.

Preferably said optional third amino acid position is selected from the group consisting of position R166, D298, and R393, each in human arrestin-3 of SEQ ID NO: 1. More preferably said optional third amino acid position is R166 or D298, each in human arrestin-3 of SEQ ID NO: 1. Again more preferably said optional third amino acid position is R166, each in human arrestin-3 of SEQ ID NO: 1.

In a preferred embodiment, in said mutant beta-arrestin at least three amino acids are independently mutated as compared to said parent beta-arrestin. Said parent beta-arrestin is preferably of any one of SEQ ID NO: 1 or any one of SEQ ID NO: 6-12. In another preferred embodiment, in said mutant beta-arrestin at least three amino acids are independently mutated as compared to said parent beta-arrestin, wherein said parent beta-arrestin is naturally occurring arrestin-3, preferably said naturally occurring has an amino acid sequence selected from the group consisting of SEQ ID NO: 1 or any one of SEQ ID NO: 7-9.

In a preferred embodiment, the third of said at least three mutated amino acids is located at an amino acid position which corresponds to an amino acid position selected from the group consisting of R166A, D298, and R393 in human arrestin-3 of SEQ ID NO: 1. Preferably, said parent beta-arrestin has an amino acid sequence selected from the group consisting of SEQ ID NO: 1 or any one of SEQ ID NO: 6-12.

In a preferred embodiment, the third of said at least three mutated amino acids is located at an amino acid position which corresponds to an amino acid position selected from the group consisting of R166A, D298, and R393 in human arrestin-3 of SEQ ID NO: 1, wherein said parent beta-arrestin is naturally occurring arrestin-3, preferably said naturally occurring has an amino acid sequence selected from the group consisting of SEQ ID NO: 1 or any one of SEQ ID NO: 7-9.

In a preferred embodiment, in said mutant beta-arrestin of the invention at least three amino acids are independently mutated as compared to a parent beta-arrestin, wherein said at least three amino acids are located at amino acid positions which correspond to T299 at a first amino acid position, I386 at a second amino acid position and a third amino acid position, each in human arrestin-3 of SEQ ID NO: 1. Said parent beta-arrestin is a naturally occurring beta-arrestin. More preferably said parent beta-arrestin is selected from the group consisting of naturally occurring human, bovine, mouse, and rat beta-arrestin, wherein human beta-arrestin arrestin is more preferred. Again more preferably, said parent beta-arrestin is selected from the group consisting of SEQ ID NO: 1, or any one of SEQ ID NO: 6-12, wherein SEQ ID NO: 1 or 6 is again more preferred.

In a preferred embodiment, in said mutant beta-arrestin at least three amino acids are independently mutated as compared to said parent beta-arrestin, wherein said parent beta-arrestin is a naturally occurring arrestin-3 mutant. In a more preferred embodiment, in said mutant beta-arrestin at least three amino acids are independently mutated as compared to said parent beta-arrestin, wherein said parent beta-arrestin is a naturally occurring arrestin-3 mutant, wherein said at least three amino acids are located at amino acid positions which correspond to T299 at a first amino acid position, I386 at a second amino acid position and a third amino acid position, each in human arrestin-3 of SEQ ID NO: 1, wherein said parent beta-arrestin is a naturally occurring arrestin-3 mutant. More preferably said parent beta-arrestin is selected from the group consisting of naturally occurring human, bovine, mouse, and rat arrestin-3, wherein human arrestin is more preferred. Again more preferably, said beta-arrestin is selected from the group consisting of SEQ ID NO: 1, SEQ ID NO: 7, SEQ ID NO: 8 and SEQ ID NO: 9, wherein SEQ ID NO: 1 is again more preferred.

In a preferred embodiment, in said mutant beta-arrestin of the invention at least three amino acids are independently mutated as compared to a parent beta-arrestin, wherein said at least three amino acids are located at amino acid positions which correspond to T299 at a first amino acid position, I386 at a second amino acid position and said third amino acid position is selected from the group consisting of position R166, D298, and R393, each in human arrestin-3 of SEQ ID NO: 1. Said parent beta-arrestin is a naturally occurring beta-arrestin. More preferably said parent beta-arrestin is selected from the group consisting of naturally occurring human, bovine, mouse, and rat beta-arrestin, wherein human beta-arrestin arrestin is more preferred. Again more preferably, said parent beta-arrestin is selected from the group consisting of SEQ ID NO: 1, or any one of SEQ ID NO: 6-12, wherein SEQ ID NO: 1 or 6 is more preferred.

In a preferred embodiment, in said mutant beta-arrestin at least three amino acids are independently mutated as compared to a parent beta-arrestin, wherein said at least three amino acids are located at amino acid positions which correspond to T299 at a first amino acid position, I386 at a second amino acid position and said third amino acid position is selected from the group consisting of position R166, D298, and R393, each in human arrestin-3 of SEQ ID NO: 1, wherein said parent beta-arrestin is a naturally occurring arrestin-3 mutant. More preferably, said naturally occurring arrestin-3 is selected from the group consisting of naturally occurring human, bovine, mouse, and rat arrestin-3, wherein human arrestin is more preferred. Again more preferably, said naturally occurring arrestin-3 is selected from the group consisting of SEQ ID NO: 1, SEQ ID NO: 7, SEQ ID NO: 8 and SEQ ID NO: 9, wherein SEQ ID NO: 1 is again more preferred.

In a preferred embodiment, in said mutant beta-arrestin of the invention at least three amino acids are independently mutated as compared to a parent beta-arrestin, wherein said at least three amino acids are located at amino acid positions which correspond to T299 at a first amino acid position, I386 at a second amino acid position and a third amino acid position, wherein said third amino acid position is R166 or D298, each in human arrestin-3 of SEQ ID NO: 1. In another preferred embodiment, in said mutant beta-arrestin of the invention at least three amino acids are independently mutated as compared to a parent beta-arrestin, wherein said at least three amino acids are located at amino acid positions which correspond to T299 at a first amino acid position, I386 at a second amino acid position and R166 at a third amino acid position, each in human arrestin-3 of SEQ ID NO: 1. In another preferred embodiment, in said mutant beta-arrestin of the invention at least three amino acids are independently mutated as compared to a parent beta-arrestin, wherein said at least three amino acids are located at amino acid positions which correspond to T299 at a first amino acid position, I386 at a second amino acid position and D298 at a third amino acid position, each in human arrestin-3 of SEQ ID NO: 1. In another preferred embodiment, in said mutant beta-arrestin of the invention at least three amino acids are independently mutated as compared to a parent beta-arrestin, wherein said at least three amino acids are located at amino acid positions which correspond to T299 at a first amino acid position, I386 at a second amino acid position and R393 at a third amino acid position, each in human arrestin-3 of SEQ ID NO: 1. Said parent beta-arrestin is a naturally occurring beta-arrestin. More preferably said parent beta-arrestin is selected from the group consisting of naturally occurring human, bovine, mouse, and rat beta-arrestin, wherein human beta-arrestin arrestin is more preferred. Again more preferably, said parent beta-arrestin is selected from the group consisting of SEQ ID NO: 1, or any one of SEQ ID NO: 6-12, wherein SEQ ID NO: 1 or 6 is more preferred.

In a preferred embodiment, in said mutant beta-arrestin at least three amino acids are independently mutated as compared to a parent beta-arrestin, wherein said at least three amino acids are located at amino acid positions which correspond to T299 at a first amino acid position, I386 at a second amino acid position and a third amino acid position, wherein said third amino acid position is R166 or D298, each in human arrestin-3 of SEQ ID NO: 1, wherein said parent beta-arrestin is a naturally occurring arrestin-3 mutant. In another preferred embodiment, in said mutant beta-arrestin at least three amino acids are independently mutated as compared to a parent beta-arrestin, wherein said at least three amino acids are located at amino acid positions which correspond to T299 at a first amino acid position, I386 at a second amino acid position and R166 at a third amino acid position, each in human arrestin-3 of SEQ ID NO: 1, wherein said parent beta-arrestin is a naturally occurring arrestin-3 mutant. In another preferred embodiment, in said mutant beta-arrestin at least three amino acids are independently mutated as compared to a parent beta-arrestin, wherein said at least three amino acids are located at amino acid positions which correspond to T299 at a first amino acid position, I386 at a second amino acid position and D298 at a third amino acid position, each in human arrestin-3 of SEQ ID NO: 1, wherein said parent beta-arrestin is a naturally occurring arrestin-3 mutant. In another preferred embodiment, in said mutant beta-arrestin at least three amino acids are independently mutated as compared to a parent beta-arrestin, wherein said at least three amino acids are located at amino acid positions which correspond to T299 at a first amino acid position, I386 at a second amino acid position and R393 at a third amino acid position, each in human arrestin-3 of SEQ ID NO: 1, wherein said parent beta-arrestin is a naturally occurring arrestin-3 mutant. More preferably said naturally occurring arrestin-3 is selected from the group consisting of naturally occurring human, bovine, mouse, and rat arrestin-3, wherein human arrestin is more preferred. Again more preferably, said naturally occurring arrestin-3 is selected from the group consisting of SEQ ID NO: 1, SEQ ID NO: 7, SEQ ID NO: 8 and SEQ ID NO: 9, wherein SEQ ID NO: 1 is again more preferred.

In a preferred embodiment, in said mutant beta-arrestin at least four amino acids are independently mutated as compared to a parent beta-arrestin, wherein said at least four amino acids are located at amino acid positions which correspond to T299 at a first amino acid position, I386 at a second amino acid position, R166, D298, or R393 at a third amino acid position and a fourth amino acid position, each in human arrestin-3 of SEQ ID NO: 1. Said parent beta-arrestin is a naturally occurring beta-arrestin. More preferably said parent beta-arrestin is selected from the group consisting of naturally occurring human, bovine, mouse, and rat beta-arrestin, wherein human beta-arrestin arrestin is more preferred. Again more preferably, said parent beta-arrestin is selected from the group consisting of SEQ ID NO: 1, or any one of SEQ ID NO: 6-12, wherein SEQ ID NO: 1 or 6 is more preferred.

In a preferred embodiment, in said mutant beta-arrestin at least four amino acids are independently mutated as compared to a parent arrestin-3, wherein said at least four amino acids are located at amino acid positions which correspond to T299 at a first amino acid position, I386 at a second amino acid position, R166, D298, or R393 at a third amino acid position and a fourth amino acid position, each in human arrestin-3 of SEQ ID NO: 1, wherein said parent beta-arrestin is naturally occurring arrestin-3. More preferably said naturally occurring arrestin-3 is selected from the group consisting of naturally occurring human, bovine, mouse, and rat arrestin-3, wherein human arrestin is more preferred. Again more preferably, said naturally occurring arrestin-3 is selected from the group consisting of SEQ ID NO: 1, SEQ ID NO: 7, SEQ ID NO: 8 and SEQ ID NO: 9, wherein SEQ ID NO: 1 is again more preferred.

In a preferred embodiment, in said mutant beta-arrestin at least two amino acids are independently mutated as compared to a parent beta-arrestin, which is a naturally occurring beta-arrestin, wherein said at least two amino acids are located at amino acid positions which correspond to I386 and T299 in human arrestin-3 of SEQ ID NO: 1 (double mutant T299+I386). In a preferred embodiment, in said mutant beta-arrestin at least two amino acids are independently mutated as compared to a parent beta-arrestin, wherein said parent beta-arrestin is preferably a naturally occurring arrestin-3, wherein said at least two amino acids are located at amino acid positions which correspond to I386 and T299 in human arrestin-3 of SEQ ID NO: 1 (double mutant T299+I386).

In a preferred embodiment, in said mutant beta-arrestin
  at least two amino acids are independently mutated as compared to a parent beta-arrestin, preferably a naturally occurring beta-arrestin, wherein said at least two amino acids are located at amino acid positions which correspond to I386 and T299 in human arrestin-3 of SEQ ID NO: 1, or
  at least three amino acids are independently mutated as compared to a parent beta-arrestin, preferably a naturally occurring beta-arrestin, wherein said at least three amino acids are located at amino acid positions which correspond to T299 at a first amino acid position, I386 at a second amino acid position, and R166, D298, or R393 at a third amino acid position, each in human arrestin-3 of SEQ ID NO: 1. Said parent beta-arrestin is a naturally occurring beta-arrestin. More preferably said parent beta-arrestin is selected from the group consisting of naturally occurring human, bovine, mouse, and rat beta-arrestin, wherein human beta-arrestin arrestin is more preferred. Again more preferably, said parent beta-arrestin is selected from the group consisting of SEQ ID NO: 1, or any one of SEQ ID NO: 6-12, wherein SEQ ID NO: 1 or 6 is more preferred.

In a preferred embodiment, in said mutant beta-arrestin
  at least two amino acids are independently mutated as compared to a parent beta-arrestin, preferably a naturally occurring beta-arrestin, wherein said at least two amino acids are located at amino acid positions which correspond to I386 and T299 in human arrestin-3 of SEQ ID NO: 1, or
  at least three amino acids are independently mutated as compared to a parent beta-arrestin, preferably a naturally occurring beta-arrestin, wherein said at least three amino acids are located at amino acid positions which correspond to T299 at a first amino acid position, I386 at a second amino acid position, and R166, or D298, at a third amino acid position, each in human arrestin-3 of SEQ ID NO: 1. Said parent beta-arrestin is a naturally occurring beta-arrestin. More preferably said parent beta-arrestin is selected from the group consisting of naturally occurring human, bovine, mouse, and rat beta-arrestin, wherein human beta-arrestin arrestin is more preferred. Again more preferably, said parent beta-arrestin is selected from the group consisting of SEQ ID NO: 1, or any one of SEQ ID NO: 6-12, wherein SEQ ID NO: 1 or 6 is more preferred.

In a preferred embodiment, in said mutant beta-arrestin
  at least two amino acids are independently mutated as compared to a parent beta-arrestin, preferably a naturally occurring beta-arrestin, wherein said at least two amino acids are located at amino acid positions which correspond to I386 and T299 in human arrestin-3 of SEQ ID NO: 1, or
  at least three amino acids are independently mutated as compared to a parent beta-arrestin, preferably a naturally occurring beta-arrestin, wherein said at least three amino acids are located at amino acid positions which correspond to T299 at a first amino acid position, I386 at a second amino acid position, and R166 at a third amino acid position, each in human arrestin-3 of SEQ ID NO: 1. Said parent beta-arrestin is a naturally occurring beta-arrestin. More preferably said parent beta-arrestin is selected from the group consisting of naturally occurring human, bovine, mouse, and rat beta-arrestin, wherein human beta-arrestin arrestin is more preferred. Again more preferably, said parent beta-arrestin is selected from the group consisting of SEQ ID NO: 1, or any one of SEQ ID NO: 6-12, wherein SEQ ID NO: 1 or 6 is more preferred.

In a preferred embodiment, in said mutant beta-arrestin
  at least two amino acids are independently mutated as compared to a parent beta-arrestin, preferably a naturally occurring beta-arrestin, wherein said at least two amino acids are located at amino acid positions which correspond to I386 and T299 in human arrestin-3 of SEQ ID NO: 1, or
  at least three amino acids are independently mutated as compared to a parent beta-arrestin, preferably a naturally occurring beta-arrestin, wherein said at least three amino acids are located at amino acid positions which correspond to T299 at a first amino acid position, I386 at a second amino acid position, and D298 at a third amino acid position, each in human arrestin-3 of SEQ ID NO: 1. Said parent beta-arrestin is a naturally occurring beta-arrestin. More preferably said parent beta-arrestin is selected from the group consisting of naturally occurring human, bovine, mouse, and rat beta-arrestin, wherein human beta-arrestin arrestin is more preferred. Again more preferably, said parent beta-arrestin is selected from the group consisting of SEQ ID NO: 1, or any one of SEQ ID NO: 6-12, wherein SEQ ID NO: 1 or 6 is more preferred.

In a preferred embodiment, in said mutant beta-arrestin at least two amino acids are independently mutated as compared to a parent beta-arrestin, preferably a naturally occurring beta-arrestin, wherein said at least two amino acids are located at amino acid positions which correspond to I386 and T299 in human arrestin-3 of SEQ ID NO: 1, or at least three amino acids are independently mutated as compared to a parent beta-arrestin, preferably a naturally occurring beta-arrestin, wherein said at least three amino acids are located at amino acid positions which correspond to T299 at a first amino acid position, I386 at a second amino acid position, and R393 at a third amino acid position, each in human arrestin-3 of SEQ ID NO: 1. Said parent beta-arrestin is a naturally occurring beta-arrestin. More preferably said parent beta-arrestin is selected from the group consisting of naturally occurring human, bovine, mouse, and rat beta-arrestin, wherein human beta-arrestin arrestin is more preferred. Again more preferably, said parent beta-arrestin is selected from the group consisting of SEQ ID NO: 1, or any one of SEQ ID NO: 6-12, wherein SEQ ID NO: 1 or 6 is more preferred.

In a preferred embodiment, in said mutant beta-arrestin at least three amino acids are independently mutated as compared to a parent beta-arrestin, which is a naturally occurring beta-arrestin, wherein said at least three amino acids are located at amino acid positions which correspond to T299 at a first amino acid position, I386 at a second amino acid position, and R166, D298, or R393 at a third amino acid position, each in human arrestin-3 of SEQ ID NO: 1. More preferably said parent beta-arrestin is selected from the group consisting of naturally occurring human, bovine, mouse, and rat beta-arrestin, wherein human beta-arrestin arrestin is more preferred. Again more preferably, said parent beta-arrestin is selected from the group consisting of SEQ ID NO: 1, or any one of SEQ ID NO: 6-12, wherein SEQ ID NO: 1 or 6 is more preferred.

In a preferred embodiment, said parent beta-arrestin is selected from the group consisting of naturally occurring human, bovine, mouse and rat beta-arrestin or a protein having an amino acid sequence identity of 80% to 100% with any one of said naturally occurring beta-arrestin. In a further preferred embodiment, said parent beta-arrestin is naturally occurring human beta-arrestin or a protein having an amino acid sequence identity of 80% to 100% with naturally occurring human beta-arrestin. In an again further preferred embodiment, said parent beta-arrestin is naturally occurring human beta-arrestin. In another preferred embodiment, said parent beta-arrestin is a parent arrestin-3, wherein said parent arrestin-3 is selected from the group consisting of naturally occurring human, bovine, mouse and rat arrestin-3 or a protein having an amino acid sequence identity of 80% to 100% with any one of said naturally occurring arrestin-3. In a further preferred embodiment, said parent beta-arrestin is parent arrestin-3, wherein said parent arrestin-3 is naturally occurring human beta-arrestin or a protein having an amino acid sequence identity of 80% to 100% with naturally occurring human beta-arrestin. In an again further preferred embodiment, said parent beta-arrestin is parent arrestin-3, wherein said parent arrestin-3 is naturally occurring human beta-arrestin. Preferably, said protein having an amino acid sequence identity of 80% to 100% with any one of said naturally occurring beta-arrestin or arrestin-3 retains ligand-binding ability to GPCR. Preferably said GPCR is a Rhodopsin-like receptor, more preferably a Rhodopsin-like receptor of subfamily A17. Again more preferably, said GPCR is an adrenergic receptor. Again more preferably said GPCR is a beta-2 adrenergic receptor. Preferably, said beta-2 adrenergic receptor is a canonical naturally occurring human, mouse, rat or bovine beta-2 adrenergic receptor.

In a further preferred embodiment, said parent beta-arrestin is a protein having an amino acid sequence identity of 80% to 100%, more preferably 85% to 100%, again more preferably 90% to 100%, again more preferably 95% to 100%, again more preferably 99% to 100%, most preferably 100% when compared to naturally occurring human, bovine, mouse, or rat beta-arrestin, wherein human arrestin is more preferred. In a further preferred embodiment, said parent beta-arrestin is parent arrestin-3, wherein said parent arrestin-3 is a protein having an amino acid sequence identity of 80% to 100%, more preferably 85% to 100%, again more preferably 90% to 100%, again more preferably 95% to 100%, again more preferably 99% to 100%, most preferably 100% when compared to naturally occurring human, bovine, mouse, or rat arrestin-3, wherein human arrestin is more preferred.

In a further preferred embodiment, said mutant beta-arrestin is a protein having an amino acid sequence identity of 80% to 100%, more preferably 85% to 100%, again more preferably 90% to 100%, again more preferably 95% to 100%, again more preferably 99% to 100%, most preferably 100% when compared to naturally occurring human, bovine, mouse, or rat beta-arrestin, wherein human beta-arrestin is more preferred. In a further preferred embodiment, said parent beta-arrestin is parent arrestin-3, wherein said mutant arrestin-3 is a protein having an amino acid sequence identity of 80% to 100%, more preferably 85% to 100%, again more preferably 90% to 100%, again more preferably 95% to 100%, again more preferably 99% to 100%, most preferably 100% when compared to naturally occurring human, bovine, mouse, or rat arrestin-3, wherein human arrestin-3 is more preferred.

In another preferred embodiment, said parent beta-arrestin is selected from the group consisting of naturally occurring human, bovine, mouse, and rat beta-arrestin, wherein human beta-arrestin is more preferred. In a further preferred embodiment of this invention, said mutant beta-arrestin is mutant arrestin-3 and said parent beta-arrestin is a naturally occurring arrestin-3. In a further preferred embodiment of this invention, said parent beta-arrestin is selected from the group consisting of naturally occurring human, bovine, mouse and rat arrestin-3. In another preferred embodiment, said beta-arrestin is arrestin-3 and said parent beta-arrestin is parent arrestin-3, wherein said parent arrestin-3 is selected from the group consisting of naturally occurring human, bovine, mouse, and rat arrestin-3, wherein human arrestin-3 is more preferred.

In a preferred embodiment, said mutant beta-arrestin of the invention has an amino acid sequence identity of 80% to 100%, preferably of 90% to 100%, with any one of SEQ ID NO: 1 or any one of SEQ ID NO: 6-12. In another preferred embodiment, said mutant beta-arrestin has an amino acid sequence identity of 80% to 100%, preferably of 90% to 100%, with any one of SEQ ID NO: 1 or any one of SEQ ID NO: 7-9. In a further preferred embodiment, said parent beta-arrestin is a naturally occurring arrestin-3, wherein said mutant beta-arrestin has an amino acid sequence identity of 80% to 100%, preferably of 90% to 100%, with any one of SEQ ID NO: 1 or any one of SEQ ID NO: 7-9.

In a preferred embodiment, said parent beta-arrestin has an amino acid sequence selected from the group consisting of SEQ ID NO: 1 or any one of SEQ ID NO: 6-12, or an amino acid sequence having an identity of 80% to 100% with any one of SEQ ID NO: 1 or any one of SEQ ID NO: 6-12. In another preferred embodiment, said parent beta-arrestin is parent arrestin-3, wherein said parent arrestin-3 has an amino acid sequence selected from the group consisting of SEQ ID NO: 1 or any one of SEQ ID NO: 7-9, or an amino acid sequence having an identity of 80% to 100% with any one of SEQ ID NO: 1 or any one of SEQ ID NO: 7-9. In a preferred embodiment, said parent beta-arrestin has an amino acid sequence selected from the group consisting of SEQ ID NO: 1, or an amino acid sequence having an identity of 80% to 100% with SEQ ID NO: 1. In a preferred embodiment, said parent beta-arrestin is parent arrestin-3, wherein said parent arrestin-3 has an amino acid sequence of SEQ ID NO: 1, or an amino acid sequence having an identity of 80% to 100% with any one of SEQ ID NO: 1 or any one of SEQ ID NO: 7-9. In another preferred embodiment, said parent beta-arrestin is parent arrestin-3, wherein said parent arrestin-3 has an amino acid sequence selected from the group consisting of SEQ ID NO: 1 or any one of SEQ ID NO: 7-9, or an amino acid sequence having an identity of 80% to 100% with any one of SEQ ID NO: 1 or any one of SEQ ID NO: 7-9. Preferably said amino acid sequence having an identity of 80% to 100% with any one of SEQ ID NO: 1 or any one of SEQ ID NO: 7-9 or amino acid sequence having an identity of 80% to 100% with any one of SEQ ID NO: 1 or any one of SEQ ID NO: 6-12 retains ligand-binding ability to GPCR. Preferably said GPCR is a Rhodopsin-like receptor, more preferably a Rhodopsin-like receptor of subfamily A17. Again more preferably, said GPCR is an adrenergic receptor. Again more preferably said GPCR is a beta-2 adrenergic receptor. Preferably, said beta-2 adrenergic receptor is a canonical naturally occurring human, mouse, rat or bovine beta-2 adrenergic receptor.

In a further preferred embodiment, said parent beta-arrestin is a protein having an amino acid sequence identity of 80% to 100%, more preferably 85% to 100%, again more preferably 90% to 100%, again more preferably 95% to 100%, again more preferably 99% to 100%, most preferably 100%, when compared to an amino acid sequence selected from the group consisting of SEQ ID NO: 1 or any one of SEQ ID NO: 6-12, wherein SEQ ID NO: 1 or 6 is more preferred. In a further preferred embodiment, said parent beta-arrestin is parent arrestin-3, wherein said parent arrestin-3 is a protein having an amino acid sequence identity of 80% to 100%, more preferably 85% to 100%, again more preferably 90% to 100%, again more preferably 95% to 100%, again more preferably 99% to 100%, most preferably 100%, when compared to an amino acid sequence selected from the group consisting of SEQ ID NO: 1 or any one of SEQ ID NO: 7-9, wherein SEQ ID NO: 1 is more preferred.

In a preferred embodiment, said parent beta-arrestin has an amino acid sequence selected from the group consisting of SEQ ID NO: 1 or any one of SEQ ID NO: 6-12. In a preferred embodiment, said parent beta-arrestin is parent arrestin-3, wherein said parent arrestin-3 has an amino acid sequence selected from the group consisting of SEQ ID NO: 1 or any one of SEQ ID NO: 7-9.

In a preferred embodiment, in said mutant beta-arrestin of the invention at least two and at most 80 amino acid positions, preferably at least two and at most 40 amino acid positions, further preferably at least two and at most 20 amino acid positions, again more preferably at least two and at most 10 amino acid positions, again more preferably at least two and at most 5 amino acid positions, again more preferably at least two and at most 4 amino acid positions, and most preferably at least two and at most 3 amino acid positions amino acid positions are mutated as compared to said parent beta-arrestin.

In a preferred embodiment, at least two and at most 40 amino acid positions, further preferably at least two and at most 20 amino acid positions, again more preferably at least two and at most 10 amino acid positions, again more preferably at least two and at most 5 amino acid positions are mutated in said mutant beta-arrestin of the invention as compared to said parent beta-arrestin. Said parent beta-arrestin is a naturally occurring beta-arrestin. More preferably said parent beta-arrestin is selected from the group consisting of naturally occurring human, bovine, mouse, and rat beta-arrestin, wherein human beta-arrestin arrestin is more preferred. Again more preferably, said parent beta-arrestin is selected from the group consisting of SEQ ID NO: 1, or any one of SEQ ID NO: 6-12, wherein SEQ ID NO: 1 or 6 is more preferred.

In a preferred embodiment, said mutant beta-arrestin of the invention is a mutant arrestin-3, wherein at least two and at most 80 amino acid positions, preferably at least two and at most 40 amino acid positions, further preferably at least two and at most 20 amino acid positions, again more preferably at least two and at most 10 amino acid positions, again more preferably at least two and at most 5 amino acid positions, again more preferably at least two and at most 4 amino acid positions, and most preferably at least two and at most 3 amino acid positions amino acid positions are mutated, as compared to said parent beta-arrestin, wherein said parent beta-arrestin is a naturally occurring arrestin-3.

In a preferred embodiment, at least two and at most 40 amino acid positions, further preferably at least two and at most 20 amino acid positions, again more preferably at least two and at most 10 amino acid positions, again more preferably at least two and at most 5 amino acid positions are mutated in said mutant beta-arrestin of the invention as compared to said parent beta-arrestin, wherein said parent beta-arrestin is naturally occurring arrestin-3, preferably said naturally occurring arrestin-3 has an amino acid sequence selected from the group consisting of SEQ ID NO: 1 or 7-9. More preferably said naturally occurring arrestin-3 is selected from the group consisting of naturally occurring human, bovine, mouse, and rat arrestin-3, wherein human arrestin is more preferred. Again more preferably, said naturally occurring arrestin-3 is selected from the group consisting of SEQ ID NO: 1, SEQ ID NO: 7, SEQ ID NO: 8 and SEQ ID NO: 9, wherein SEQ ID NO: 1 is again more preferred.

In a further preferred embodiment, in said mutant beta-arrestin of the present invention, independently at least two and at most 4 amino acid positions, again more preferably at least two and at most 3 amino acid positions amino acid positions are mutated as compared to said parent beta-arrestin. In a further preferred embodiment, in said mutant beta-arrestin of the present invention, independently at least two and at most 4 amino acid positions, again more preferably at least two and at most 3 amino acid positions amino acid positions are mutated as compared to said parent beta-arrestin, wherein said parent beta-arrestin is naturally occurring arrestin-3, preferably said naturally occurring has an amino acid sequence selected from the group consisting of SEQ ID NO: 1 or 7-9.

In a further preferred embodiment, in said mutant beta-arrestin of the present invention, exactly two or exactly three amino acids are independently mutated as compared to said parent beta-arrestin. In a further preferred embodiment, in said mutant beta-arrestin of the present invention, independently exactly four amino acid positions are mutated as compared to said parent beta-arrestin. In a further very preferred embodiment, in said mutant beta-arrestin of the present invention, independently exactly two amino acid positions are mutated as compared to said parent beta-arrestin. In a further very preferred embodiment, in said mutant beta-arrestin of the present invention, independently exactly three amino acid positions are mutated as compared to said parent beta-arrestin. More preferably said parent beta-arrestin is selected from the group consisting of naturally occurring human, bovine, mouse, and rat beta-arrestin, wherein human beta-arrestin arrestin is more preferred. Again more preferably, said parent beta-arrestin is selected from the group consisting of SEQ ID NO: 1, or any one of SEQ ID NO: 6-12, wherein SEQ ID NO: 1 or 6 is more preferred.

In a further preferred embodiment, in said mutant beta-arrestin of the present invention, exactly two or exactly three amino acids are independently mutated as compared to parent beta-arrestin, wherein said parent beta-arrestin is naturally occurring arrestin-3, preferably said naturally occurring arrestin-3 has an amino acid sequence selected from the group consisting of SEQ ID NO: 1 or 7-9. In a further preferred embodiment, in said beta-arrestin mutant of the invention independently exactly four amino acid positions are mutated as compared to said parent beta-arrestin, which is a naturally occurring arrestin-3. In a further very preferred embodiment, in said beta-arrestin mutant of the invention independently exactly two amino acid positions are mutated as compared to said parent beta-arrestin, which is a naturally occurring arrestin-3. In a further very preferred embodiment, in said beta-arrestin mutant of the invention independently exactly three amino acid positions are mutated as compared to said parent beta-arrestin, which is a naturally occurring arrestin-3. More preferably said naturally occurring arrestin-3 is selected from the group consisting of naturally occurring human, bovine, mouse, and rat arrestin-3, wherein human arrestin is more preferred. Again more preferably, said naturally occurring arrestin-3 is selected from the group consisting of SEQ ID NO: 1, SEQ ID NO: 7, SEQ ID NO: 8 and SEQ ID NO: 9, wherein SEQ ID NO: 1 is again more preferred.

In a preferred embodiment, said mutated amino acid or mutation is an exchange of a single amino acid by a different single amino acid, wherein said different amino acid is selected from the group consisting of glycine, alanine, 2-aminobutyric acid, 2-aminoheptanoic acid, tertleucine, diethylalanine, homoleucine, 3-methyl-1-alloisoleucine, allo-isoleucine, isoleucine, leucine, norleucine, norvaline, valine, vinylglycine, and 2-allyl-glycine. More preferably, said different amino acid is selected from the group consisting of glycine, alanine, 2-aminobutyric acid, allo-isoleucine, isoleucine, leucine, norleucine, norvaline, and valine. Again more preferably said different amino acid is glycine, alanine, leucine isoleucine or valine. Once again more preferably, said different amino acid is alanine. However, when the particular amino acid residue in the parent is already alanine, it is preferred that it is replaced with glycine, valine, leucine or isoleucine.

In a preferred embodiment, said mutant beta-arrestin has an amino acid sequence selected from the group consisting of SEQ ID NO: 2, SEQ ID NO: 3, SEQ ID NO: 4, SEQ ID NO: 5, SEQ ID NO: 13, SEQ ID NO: 14, SEQ ID NO: 15, and SEQ ID NO: 16 or an amino acid sequence having an identity of 80% to 100%, preferably of 90% to 100%, with any one of SEQ ID NO: 2, SEQ ID NO: 3, SEQ ID NO: 4, SEQ ID NO: 5, SEQ ID NO: 13, SEQ ID NO: 14, SEQ ID NO: 15, and SEQ ID NO: 16. In a preferred embodiment, said mutant beta-arrestin has an amino acid sequence selected from the group consisting of SEQ ID NO: 2, SEQ ID NO: 3, SEQ ID NO: 4, SEQ ID NO: 5, SEQ ID NO: 13, SEQ ID NO: 14, SEQ ID NO: 15, and SEQ ID NO: 16 or an amino acid sequence having an identity of 80% to 100%, preferably of 90% to 100%, more preferably of 95% to 100%, again more preferably of 99% to 100%, with any one of SEQ ID NO: 2, SEQ ID NO: 3, SEQ ID NO: 4, SEQ ID NO: 5, SEQ ID NO: 13, SEQ ID NO: 14, SEQ ID NO: 15, and SEQ ID NO: 16.

In a preferred embodiment, said mutant beta-arrestin of the invention has a sequence selected from the group consisting of SEQ ID NO: 2, SEQ ID NO: 3, SEQ ID NO: 4, SEQ ID NO: 5, SEQ ID NO: 13, SEQ ID NO: 14, SEQ ID NO: 15, and SEQ ID NO: 16.

In a preferred embodiment, said mutant beta-arrestin has an amino acid sequence selected from the group consisting of SEQ ID NO: 2, SEQ ID NO: 3, SEQ ID NO: 4, and SEQ ID NO: 5 or an amino acid sequence having an identity of 80% to 100%, preferably of 90% to 100%, with any one of SEQ ID NO: 2, SEQ ID NO: 3, SEQ ID NO: 4, and SEQ ID NO: 5. In a preferred embodiment, said mutant beta-arrestin has an amino acid sequence selected from the group consisting of SEQ ID NO: 2, SEQ ID NO: 3, SEQ ID NO: 4, and SEQ ID NO: 5 or an amino acid sequence having an identity of 80% to 100%, preferably of 90% to 100%, more preferably of 95% to 100%, again more preferably of 99% to 100%, with any one of SEQ ID NO: 2, SEQ ID NO: 3, SEQ ID NO: 4, and SEQ ID NO: 5.

In a more preferred embodiment, said mutant beta-arrestin of the invention has a sequence selected from the group consisting of SEQ ID NO: 2, SEQ ID NO: 3, SEQ ID NO: 4, and SEQ ID NO: 5.

In a preferred embodiment, said mutant beta-arrestin of the invention has a sequence selected from the group consisting of SEQ ID NO: 2, SEQ ID NO: 3, and SEQ ID NO: 4. In a preferred embodiment, said mutant beta-arrestin of the invention has a sequence of SEQ ID NO: 2 or SEQ ID NO: 4. In a preferred embodiment, said mutant beta-arrestin of the invention has a sequence of SEQ ID NO: 2. In a preferred embodiment, said mutant beta-arrestin of the invention has a sequence of SEQ ID NO: 3. In a preferred embodiment, said mutant beta-arrestin of the invention has a sequence of SEQ ID NO: 4. In a preferred embodiment, said mutant beta-arrestin of the invention has a sequence of SEQ ID NO: 5. In a preferred embodiment, said mutant beta-arrestin of the invention has a sequence of SEQ ID NO: 13. In a preferred embodiment, said mutant beta-arrestin of the invention has a sequence of SEQ ID NO: 14. In a preferred embodiment, said mutant beta-arrestin of the invention has a sequence of SEQ ID NO: 15. In a preferred embodiment, said mutant beta-arrestin of the invention has a sequence of SEQ ID NO: 16.

In a further aspect, said invention relates to a composition comprising the beta-arrestin mutant of the invention.

In a further aspect, said invention relates to a pair of a mutant beta-arrestin and a GPCR.

Preferably said GPCR is a Rhodopsin-like receptor, more preferably a Rhodopsin-like receptor of subfamily A17. Again more preferably, said GPCR is an adrenergic receptor. Again more preferably said GPCR is a beta-2 adrenergic receptor. Preferably, said beta-2 adrenergic receptor is a canonical naturally occurring human, mouse, rat or bovine beta-2 adrenergic receptor.

In a further aspect, said invention relates to a composition comprising a pair of a mutant beta-arrestin and a GPCR. Preferably said GPCR is a Rhodopsin-like receptor, more preferably a Rhodopsin-like receptor of subfamily A17. Again more preferably, said GPCR is an adrenergic receptor. Again more preferably said GPCR is a beta-2 adrenergic receptor. Preferably, said beta-2 adrenergic receptor is a canonical naturally occurring human, mouse, rat or bovine beta-2 adrenergic receptor. In said pair, said mutant beta-arrestin and said GPCR can be unattached to each other or bound to each other. In said composition comprising a pair of a mutant beta-arrestin and a GPCR, said mutant beta-arrestin and said GPCR can be unattached to each other, bound to each other or partly bound and partly unattached to each other.

In a further aspect, said invention relates to a complex of a mutant beta-arrestin and a GPCR. Preferably said GPCR is a Rhodopsin-like receptor, more preferably a Rhodopsin-like receptor of subfamily A17. Again more preferably, said GPCR is an adrenergic receptor. Again more preferably said GPCR is a beta-2 adrenergic receptor. Preferably, said beta-2 adrenergic receptor is a canonical naturally occurring human, mouse, rat or bovine beta-2 adrenergic receptor.

In a further aspect, said invention relates to a composition comprising a complex of a mutant beta-arrestin and a GPCR. Preferably said GPCR is a Rhodopsin-like receptor, more preferably a Rhodopsin-like receptor of subfamily A17. Again more preferably, said GPCR is an adrenergic receptor. Again more preferably said GPCR is a beta-2 adrenergic receptor. Preferably, said beta-2 adrenergic receptor is a canonical naturally occurring human, mouse, rat or bovine beta-2 adrenergic receptor. In the complex, said mutant beta-arrestin and said GPCR are bound to each other.

In a further aspect, said invention relates to a vector encoding the mutant beta-arrestin of the invention. Preferably said GPCR is a Rhodopsin-like receptor, more preferably a Rhodopsin-like receptor of subfamily A17. Again more preferably, said GPCR is an adrenergic receptor. Again more preferably said GPCR is a beta-2 adrenergic receptor. Preferably, said beta-2 adrenergic receptor is a canonical naturally occurring human, mouse, rat or bovine beta-2 adrenergic receptor.

In a further aspect, said invention relates to a composition comprising a vector encoding the mutant beta-arrestin of the invention. Preferably said GPCR is a Rhodopsin-like receptor, more preferably a Rhodopsin-like receptor of subfamily A17. Again more preferably, said GPCR is an adrenergic receptor. Again more preferably said GPCR is a beta-2 adrenergic receptor. Preferably, said beta-2 adrenergic receptor is a canonical naturally occurring human, mouse, rat or bovine beta-2 adrenergic receptor.

In a further aspect, said invention relates to a composition comprising the mutant beta-arrestin of the invention and the vector encoding the mutant beta-arrestin of the invention.

In a further aspect, the invention relates to use of the mutant beta-arrestin of the invention or a complex of a mutant beta-arrestin of the invention and a GPCR for structure elucidation of the GPCR or the complex of the GPCR and the mutant beta-arrestin of the invention. Preferably said GPCR is a Rhodopsin-like receptor, more preferably a Rhodopsin-like receptor of subfamily A17. Again more preferably, said GPCR is an adrenergic receptor. Again more preferably said GPCR is a beta-2 adrenergic receptor. Preferably, said beta-2 adrenergic receptor is a canonical naturally occurring human, mouse, rat or bovine beta-2 adrenergic receptor.

Beta-arrestin mutants of the invention stabilize a complex of GPCR and said beta-arrestin mutants. In a preferred embodiment, said beta-arrestin mutants stabilize GPCRs in ligand-induced activation states. The complex of the GPCR and the mutant beta-arrestin of the invention have suitable properties in structure elucidation of the GPCR or the GPCR-arrestin complexes, e.g. by protein crystallization or other means. In a preferred embodiment, elucidated structures of GPCR or complexes of GPCR with beta-arrestin mutants are used to design and screen drug candidates in silico.

In a further aspect, the invention relates to use of the mutant beta-arrestin of the invention or a complex of a mutant beta-arrestin of the invention and a GPCR for drug screening, preferably in silico drug screening. In a preferred embodiment, said GPCR is a β2AR. In a preferred embodiment, the complex of a mutant beta-arrestin of the invention and a GPCR is stabilized by the beta-arrestin mutant of the invention. Preferably, said beta-arrestin mutants of the invention are able to stabilize GPCRs in ligand-induced activation states. Such active states of GPCRs, are exemplarily shown with the β2AR (Rasmussen et al., Structure of a Nanobody-Stabilized Active State of the Beta2-Adrenoceptor, Nature, 2011; Rasmussen et al., Crystal Structure of the Beta2-Adrenergic Receptor-Gs Protein Complex, Nature, 2011). Such stabilized GPCR/mutant beta-arrestin complexes are used for drug screening in cell-free and cell-based assays. In a preferred embodiment, drug screening is based on a cell-free and cell-based assay. Said beta-arrestin mutants of the invention are able to increase the efficacy and potency of beta-arrestin recruitment to GPCR, preferably to β2AR as evidenced in the BRET assay (Example 1, Table 1). Increased recruitment values may be useful in cell-based and cell-free arrestin recruitment assays to increase signal to noise ratios, especially for GPCR types that recruit arrestin by nature with low efficiency resulting in low signal to noise ratios. In a preferred embodiment, efficiency of recruitment of beta-arrestin mutants of the invention to the GPCR is measured.

SEQUENCES

```
            10         20         30         40
     MGEKPGTRVF KKSSPNCKLT VYLGKRDFVD HLDKVDPVDG 50         60         70         80
     VVLVDPDYLK DRKVFVTLTC AFRYGREDLD VLGLSFRKDL 90        100        110        120
     FIATYQAFPP VPNPPRPPTR LQDRLLRKLG QHAHPFFFTI 130        140        150        160
     PQNLPCSVTL QPGPEDTGKA CGVDFEIRAF CAKSLEEKSH 170        180        190        200
     KRNSVRLVIR KVQFAPEKPG PQPSAETTRH FLMSDRSLHL 210        220        230        240
     EASLDKELYY HGEPLNVNVH VTNNSTKTVK KIKVSVRQYA 250        260        270        280
     DICLFSTAQY KCPVAQLEQD DQVSPSSTFC KVYTITPLLS
```

```
            290        300        310        320
DNREKRGLAL DGKLKHEDTN LASSTIVKEG ANKEVLGILV 330        340        350        360
SYRVKVKLVV SRGGDVSVEL PFVLMHPKPH DHIPLPRPQS 370        380        390        400
AAPETDVPVD TNLIEFDTNY ATDDDIVFED FARLRLKGMK

DDDYDDQLC
```

SEQ ID NO: 1: Human wild-type (wt) arrestin-3

```
             10         20         30         40
MGEKPGTRVF KKSSPNCKLT VYLGKRDFVD HLDKVDPVDG 50         60         70         80
VVLVDPDYLK DRKVFVTLTC AFRYGREDLD VLGLSFRKDL 90        100        110        120
FIATYQAFPP VPNPPRPPTR LQDRLLRKLG QHAHPFFFTI 130        140        150        160
PQNLPCSVTL QPGPEDTGKA CGVDFEIRAF CAKSLEEKSH 170        180        190        200
KRNSVRLVIR KVQFAPEKPG PQPSAETTRH FLMSDRSLHL 210        220        230        240
EASLDKELYY HGEPLNVNVH VTNNSTKTVK KIKVSVRQYA 250        260        270        280
DICLFSTAQY KCPVAQLEQD DQVSPSSTFC KVYTITPLLS 290        300        310        320
DNREKRGLAL DGKLKHEDAN LASSTIVKEG ANKEVLGILV 330        340        350        360
SYRVKVKLVV SRGGDVSVEL PFVLMHPKPH DHIPLPRPQS 370        380        390        400
AAPETDVPVD TNLIEFDTNY ATDDDAVFED FARLRLKGMK

DDDYDDQLC
```

SEQ ID NO: 2: Arrestin-3 double mutant A containing T299A and I386A when compared to human wt arrestin-3 (said amino acid positions correspond to T299A and I386A in human wt arrestin-3 (SEQ ID NO: 1)).

```
             10         20         30         40
MGEKPGTRVF KKSSPNCKLT VYLGKRDFVD HLDKVDPVDG 50         60         70         80
VVLVDPDYLK DRKVFVTLTC AFRYGREDLD VLGLSFRKDL 90        100        110        120
FIATYQAFPP VPNPPRPPTR LQDRLLRKLG QHAHPFFFTI 130        140        150        160
PQNLPCSVTL QPGPEDTGKA CGVDFEIRAF CAKSLEEKSH 170        180        190        200
KRNSVALVIR KVQFAPEKPG PQPSAETTRH FLMSDRSLHL 210        220        230        240
EASLDKELYY HGEPLNVNVH VTNNSTKTVK KIKVSVRQYA 250        260        270        280
DICLFSTAQY KCPVAQLEQD DQVSPSSTFC KVYTITPLLS 290        300        310        320
DNREKRGLAL DGKLKHEDAN LASSTIVKEG ANKEVLGILV 330        340        350        360
SYRVKVKLVV SRGGDVSVEL PFVLMHPKPH DHIPLPRPQS 370        380        390        400
AAPETDVPVD TNLIEFDTNY ATDDDAVFED FARLRLKGMK

DDDYDDQLC
```

SEQ ID NO: 3: Arrestin-3 triple mutant B containing T299A, I386A and R166A when compared to human wt arrestin-3 (said amino acid positions correspond to T299A, I386A and R166A in human wt arrestin-3 (SEQ ID NO: 1)).

```
             10         20         30         40
MGEKPGTRVF KKSSPNCKLT VYLGKRDFVD HLDKVDPVDG 50         60         70         80
VVLVDPDYLK DRKVFVTLTC AFRYGREDLD VLGLSFRKDL 90        100        110        120
FIATYQAFPP VPNPPRPPTR LQDRLLRKLG QHAHPFFFTI 130        140        150        160
PQNLPCSVTL QPGPEDTGKA CGVDFEIRAF CAKSLEEKSH 170        180        190        200
KRNSVRLVIR KVQFAPEKPG PQPSAETTRH FLMSDRSLHL 210        220        230        240
EASLDKELYY HGEPLNVNVH VTNNSTKTVK KIKVSVRQYA 250        260        270        280
DICLFSTAQY KCPVAQLEQD DQVSPSSTFC KVYTITPLLS 290        300        310        320
DNREKRGLAL DGKLKHEAAN LASSTIVKEG ANKEVLGILV 330        340        350        360
SYRVKVKLVV SRGGDVSVEL PFVLMHPKPH DHIPLPRPQS 370        380        390        400
AAPETDVPVD TNLIEFDTNY ATDDDAVFED FARLRLKGMK

DDDYDDQLC
```

SEQ ID NO: 4: Arrestin-3 triple mutant C containing T299A, I386A and D298A when compared to human wt arrestin-3 (said amino acid positions correspond to T299A, I386A and D298A in human wt arrestin-3 (SEQ ID NO: 1)).

```
             10         20         30         40
MGEKPGTRVF KKSSPNCKLT VYLGKRDFVD HLDKVDPVDG 50         60         70         80
VVLVDPDYLK DRKVFVTLTC AFRYGREDLD VLGLSFRKDL 90        100        110        120
FIATYQAFPP VPNPPRPPTR LQDRLLRKLG QHAHPFFFTI 130        140        150        160
PQNLPCSVTL QPGPEDTGKA CGVDFEIRAF CAKSLEEKSH 170        180        190        200
KRNSVRLVIR KVQFAPEKPG PQPSAETTRH FLMSDRSLHL 210        220        230        240
EASLDKELYY HGEPLNVNVH VTNNSTKTVK KIKVSVRQYA 250        260        270        280
DICLFSTAQY KCPVAQLEQD DQVSPSSTFC KVYTITPLLS 290        300        310        320
DNREKRGLAL DGKLKHEDAN LASSTIVKEG ANKEVLGILV
```

```
            330        340        350        360
SYRVKVKLVV SRGGDVSVEL PFVLMHPKPH DHIPLPRPQS 370        380        390        400
AAPETDVPVD TNLIEFDTNY ATDDD_A_VFED FA_A_LRLKGMK

DDDYDDQLC
```

SEQ ID NO: 5: Arrestin-3 triple mutant D containing T299A, I386A and R393A when compared to human wt arrestin-3 (said amino acid positions correspond to T299A, I386A and R393A in human wt arrestin-3 (SEQ ID NO: 1)).

```
            10         20         30         40
MGDKGTRVFK KASPNGKLTV YLGKRDFVDH IDLVDPVDGV 50         60         70         80
VLVDPEYLKE RRVYVTLTCA FRYGREDLDV LGLTFRKDLF 90        100        110        120
VANVQSFPPA PEDKKPLTRL QERLIKKLGE HAYPFTFEIP 130        140        150        160
PNLPCSVTLQ PGPEDTGKAC GVDYEVKAFC AENLEEKIHK 170        180        190        200
RNSVRLVIRK VQYAPERPGP QPTAETTRQF LMSDKPLHLE 210        220        230        240
ASLDKEIYYH GEPISVNVHV TNNTNKTVKK IKISVRQYAD 250        260        270        280
ICLFNTAQYK CPVAMEEADD TVAPSSTFCK VYTLTPFLAN 290        300        310        320
NREKRGLALD GKLKHEDTNL ASSTLLREGA NREILGIIVS 330        340        350        360
YKVKVKLVVS RGGLLGDLAS SDVAVELPFT LMHPKPKEEP 370        380        390        400
PHREVPENET PVDTNLIELD TNDDDIVFED FARQRLKGMK

410
DDKEEEEDGT GSPQLNNR
```

SEQ ID NO: 6: Human wild-type arrestin-2

```
            10         20         30         40
MGEKPGTRVF KKSSPNCKLT VYLGKRDFVD HLDKVDPVDG 50         60         70         80
VVLVDPDYLK DRKVFVTLTC AFRYGREDLD VLGLSFRKDL 90        100        110        120
FIATYQAFPP MPNPPRPPTR LQDRLLKKLG QHAHPFFFTI 130        140        150        160
PQNLPCSVTL QPGPEDTGKA CGVDFEIRAF CAKSIEEKSH 170        180        190        200
KRNSVRLIIR KVQFAPETPG PQPSAETTRH FLMSDRRSLH 210        220        230        240
LEASLDKELY YHGEPLNVNV HVTNNSAKTV KKIRVSVRQY 250        260        270        280
ADICLFSTAQ YKCPVAQLEQ DDQVSPSSTF CKVYTITPLL 290        300        310        320
SDNREKRGLA LDGQLKHEDT NLASSTIVKE GANKEVLGIL 330        340        350        360
VSYRVKVKLV VSRGGDVSVE LPFVLMHPKP HDHITLPRPQ 370        380        390        400
SAPRETDVPV DTNLIEFDTN YATDDDIVFE DFARLRLKGM
```

```
           410
KDDDCDDQFC
```

SEQ ID NO: 7: Mouse wild-type arrestin-3

```
            10         20         30         40
MGEKPGTRVF KKSSPNCKLT VYLGKRDFVD HLDKVDPVDG 50         60         70         80
VVLVDPDYLK DRKVFVTLTC AFRYGREDLD VLGLSFRKDL 90        100        110        120
FIATYQAFPP MPNPPRPPTR LQDRLLKKLG QHAHPFFFTI 130        140        150        160
PQNLPCSVTL QPGPEDTGKA CGVDFEIRAF CAKSIEEKSH 170        180        190        200
KRNSVRLIIR KVQFAPETPG PQPSAETTRH FLMSDRRSLH 210        220        230        240
LEASLDKELY YHGEPLNVNV HVTNNSAKTV KKIRVSVRQY 250        260        270        280
ADICLFSTAQ YKCPVAQLEQ DDQVSPSSTF CKVYTITPLL 290        300        310        320
SDNREKRGLA LDGQLKHEDT NLASSTIVKE GANKEVLGIL 330        340        350        360
VSYRVKVKLV VSRGGDVSVE LPFVLMHPKP HDHITLPRPQ 370        380        390        400
SAPREIDIPV DTNLIEFDTN YATDDDIVFE DFARLRLKGM

410
KDDDCDDQFC
```

SEQ ID NO: 8: Rat wild-type arrestin-3

```
            10         20         30         40
MGEKPGTRVF KKSSPNCKLT VYLGKRDFVD HLDKVDPVDG 50         60         70         80
VVLVDPDYLK DRKVFVTLTC AFRYGREDLD VLGLSFRKDL 90        100        110        120
FIANYQAFPP TPNPPRPPTR LQERLLRKLG QHAHPFFFTI 130        140        150        160
PQNLPCSVTL QPGPEDTGKA CGVDFEIRAF CAKSLEEKSH 170        180        190        200
KRNSVRLVIR KVQFAPEKPG PQPSAETTRH FLMSDRSLHL 210        220        230        240
EASLDKELYY HGEPLNVNVH VTNNSTKTVK KIKVSVRQYA 250        260        270        280
DICLFSTAQY KCPVAQVEQD DQVSPSSTFC KVYTITPLLS 290        300        310        320
NNREKRGLAL DGKLKHEDTN LASSTIVKEG ANKEVLGILV 330        340        350        360
SYRVKVKLVV SRGGDVSVEL PFVLMHPKPH DHIALPRPQS
```

-continued

```
        370        380        390        400
AATHPPTLLP SAVPETDAPV DTNLIEFETN YATDDDIVFE 410        420
DFARLRLKGL KDEDYDDQFC
```

SEQ ID NO: 9: Bovine wild-type arrestin-3

```
         10         20         30         40
MGDKGTRVFK KASPNGKLTV YLGKRDFVDH IDLVDPVDGV 50         60         70         80
VLVDPEYLKE RRVYVTLTCA FRYGREDLDV LGLTFRKDLF 90        100        110        120
VANVQSFPPA PEDKKPLTRL QERLIKKLGE HACPFTFEIP 130        140        150        160
PNLPCSVTLQ PGPEDTGKAC GVDYEVKAFC AENLEEKIHK 170        180        190        200
RNSVRLVIRK VQYAPERPGP QPTAETTRQF LMSDKPLHLE 210        220        230        240
ASLDKEIYYH GEPISVNVHV TNNTNKTVKK IKISVRQYAD 250        260        270        280
ICLFNTAQYK CPVAMEEADD NVAPSSTFCK VYTLTPFLAN 290        300        310        320
NREKRGLALD GKLKHEDTNL ASSTLLREGA NREILGIIVS 330        340        350        360
YKVKVKLVVS RGGLLGDLAS SDVAVELPFT LMHPKPKEEP 370        380        390        400
PHREVPESET PVDTNLIELD TNDDDIVFED FARQRLKGMK

410
DDKDEEDDGT GSPHLNNR
```

SEQ ID NO: 10: Mouse wild-type arrestin-2

```
         10         20         30         40
MGDKGTRVFK KASPNGKLTV YLGKRDFVDH IDLVDPVDGV 50         60         70         80
VLVDPEYLKE RRVYVTLTCA FRYGREDLDV LGLTFRKDLF 90        100        110        120
VANVQSFPPA PEDKKPLTRL QERLIKKLGE HAYPFTFEIP 130        140        150        160
PNLPCSVTLQ PGPEDTGKAC GVDYEVKAFC AENLEEKIHK 170        180        190        200
RNSVRLVIRK VQYAPERPGP QPTAETTRQF LMSDKPLHLE 210        220        230        240
ASLDKEIYYH GEPISVNVHV TNNTNKTVKK IKISVRQYAD 250        260        270        280
ICLFNTAQYK CPVAMEEADD TVAPSSTFCK VYTLTPFLAN 290        300        310        320
NREKRGLALD GKLKHEDTNL ASSTLLREGA NREILGIIVS 330        340        350        360
YKVKVKLVVS RGGLLGDLAS SDVAVELPFT LMHPKPKEEP 370        380        390        400
PHREVPESET PVDTNLIELD TNDDDIVFED FARQRLKGMK

410
DDKDEEDDGT GSPHLNNR
```

SEQ ID NO: 11: Rat wild-type arrestin-2

```
         10         20         30         40
MGDKGTRVFK KASPNGKLTV YLGKRDFVDH IDLVEPVDGV 50         60         70         80
VLVDPEYLKE RRVYVTLTCA FRYGREDLDV LGLTFRKDLF 90        100        110        120
VANVQSFPPA PEDKKPLTRL QERLIKKLGE HAYPFTFEIP 130        140        150        160
PNLPCSVTLQ PGPEDTGKAC GVDYEVKAFC AENLEEKIHK 170        180        190        200
RNSVRLVIRK VQYAPERPGP QPTAETTRQF LMSDKPLHLE 210        220        230        240
ASLDKEIYYH GEPISVNVHV TNNTNKTVKK IKISVRQYAD 250        260        270        280
ICLFNTAQYK CPVAMEEADD TVAPSSTFCK VYTLTPFLAN 290        300        310        320
NREKRGLALD GKLKHEDTNL ASSTLLREGA NREILGIIVS 330        340        350        360
YKVKVKLVVS RGGLLGDLAS SDVAVELPFT LMHPKPKEEP 370        380        390        400
PHREVPEHET PVDTNLIELD TNDDDIVFED FARQRLKGMK

410
DDKEEEEDGT GSPRLNDR
```

SEQ ID NO: 12: Bovine wild-type arrestin-2

```
         10         20         30         40
MGDKGTRVFK KASPNGKLTV YLGKRDFVDH IDLVDPVDGV 50         60         70         80
VLVDPEYLKE RRVYVTLTCA FRYGREDLDV LGLTFRKDLF 90        100        110        120
VANVQSFPPA PEDKKPLTRL QERLIKKLGE HAYPFTFEIP 130        140        150        160
PNLPCSVTLQ PGPEDTGKAC GVDYEVKAFC AENLEEKIHK 170        180        190        200
RNSVRLVIRK VQYAPERPGP QPTAETTRQF LMSDKPLHLE 210        220        230        240
ASLDKEIYYH GEPISVNVHV TNNTNKTVKK IKISVRQYAD 250        260        270        280
ICLFNTAQYK CPVAMEEADD TVAPSSTFCK VYTLTPFLAN 290        300        310        320
NREKRGLALD GKLKHEDANL ASSTLLREGA NREILGIIVS 330        340        350        360
YKVKVKLVVS RGGLLGDLAS SDVAVELPFT LMHPKPKEEP 370        380        390        400
PHREVPENET PVDTNLIELD TNDDDAVFED FARQRLKGMK

410
DDKEEEEDGT GSPQLNNR
```

SEQ ID NO: 13: Arrestin-2 double mutant containing T298A and I386A when compared to human wt arrestin-3

(said amino acid positions correspond to T299A and I386A in human wt arrestin-3 (SEQ ID NO: 1)).

```
                10         20         30         40
        MGDKGTRVFK KASPNGKLTV YLGKRDFVDH IDLVDPVDGV
                50         60         70         80
        VLVDPEYLKE RRVYVTLTCA FRYGREDLDV LGLTFRKDLF
                90        100        110        120
        VANVQSFPPA PEDKKPLTRL QERLIKKLGE HAYPFTFEIP
               130        140        150        160
        PNLPCSVTLQ PGPEDTGKAC GVDYEVKAFC AENLEEKIHK
               170        180        190        200
        RNSVALVIRK VQYAPERPGP QPTAETTRQF LMSDKPLHLE
               210        220        230        240
        ASLDKEIYYH GEPISVNVHV TNNTNKTVKK IKISVRQYAD
               250        260        270        280
        ICLFNTAQYK CPVAMEEADD TVAPSSTFCK VYTLTPFLAN
               290        300        310        320
        NREKRGLALD GKLKHEDANL ASSTLLREGA NREILGIIVS
               330        340        350        360
        YKVKVKLVVS RGGLLGDLAS SDVAVELPFT LMHPKPKEEP
               370        380        390        400
        PHREVPENET PVDTNLIELD TNDDDAVFED FARQRLKGMK
               410
        DDKEEEEDGT GSPQLNNR
```

SEQ ID NO: 14: Arrestin-2 triple mutant containing T298A, I386A and R165A when compared to human wt arrestin-3 (said amino acid positions correspond to T299A, I386A and R166A in human wt arrestin-3 (SEQ ID NO: 1)).

```
                10         20         30         40
        MGDKGTRVFK KASPNGKLTV YLGKRDFVDH IDLVDPVDGV
                50         60         70         80
        VLVDPEYLKE RRVYVTLTCA FRYGREDLDV LGLTFRKDLF
                90        100        110        120
        VANVQSFPPA PEDKKPLTRL QERLIKKLGE HAYPFTFEIP
               130        140        150        160
        PNLPCSVTLQ PGPEDTGKAC GVDYEVKAFC AENLEEKIHK
               170        180        190        200
        RNSVRLVIRK VQYAPERPGP QPTAETTRQF LMSDKPLHLE
               210        220        230        240
        ASLDKEIYYH GEPISVNVHV TNNTNKTVKK IKISVRQYAD
               250        260        270        280
        ICLFNTAQYK CPVAMEEADD TVAPSSTFCK VYTLTPFLAN
               290        300        310        320
        NREKRGLALD GKLKHEAANL ASSTLLREGA NREILGIIVS
               330        340        350        360
        YKVKVKLVVS RGGLLGDLAS SDVAVELPFT LMHPKPKEEP
               370        380        390        400
        PHREVPENET PVDTNLIELD TNDDDAVFED FARQRLKGMK
               410
        DDKEEEEDGT GSPQLNNR
```

SEQ ID NO: 15: Arrestin-2 triple mutant C containing T298A, I386A and D297A when compared to human wt arrestin-3 (said amino acid positions correspond to T299A, I386A and D298A in human wt arrestin-3 (SEQ ID NO: 1)).

```
                10         20         30         40
        MGDKGTRVFK KASPNGKLTV YLGKRDFVDH IDLVDPVDGV
                50         60         70         80
        VLVDPEYLKE RRVYVTLTCA FRYGREDLDV LGLTFRKDLF
                90        100        110        120
        VANVQSFPPA PEDKKPLTRL QERLIKKLGE HAYPFTFEIP
               130        140        150        160
        PNLPCSVTLQ PGPEDTGKAC GVDYEVKAFC AENLEEKIHK
               170        180        190        200
        RNSVRLVIRK VQYAPERPGP QPTAETTRQF LMSDKPLHLE
               210        220        230        240
        ASLDKEIYYH GEPISVNVHV TNNTNKTVKK IKISVRQYAD
               250        260        270        280
        ICLFNTAQYK CPVAMEEADD TVAPSSTFCK VYTLTPFLAN
               290        300        310        320
        NREKRGLALD GKLKHEDANL ASSTLLREGA NREILGIIVS
               330        340        350        360
        YKVKVKLVVS RGGLLGDLAS SDVAVELPFT LMHPKPKEEP
               370        380        390        400
        PHREVPENET PVDTNLIELD TNDDDAVFED FAAQRLKGMK
               410
        DDKEEEEDGT GSPQLNNR
```

SEQ ID NO: 16: Arrestin-2 triple mutant D containing T298A, I386A and R393A when compared to human wt arrestin-3 (said amino acid positions correspond to T299A, I386A and R393A in human wt arrestin-3 (SEQ ID NO: 1)).

| SEQ ID NO: | Sequence Name: |
| --- | --- |
| 1 | Human wild-type (wt) arrestin-3 |
| 2 | Arrestin-3 double mutant A containing T299A and I386A |
| 3 | Arrestin-3 triple mutant B containing T299A, I386A and R166A |
| 4 | Arrestin-3 triple mutant C containing T299A, I386A and D298A |
| 5 | Arrestin-3 triple mutant D containing T299A, I386A and R393A |
| 6 | Human wild-type arrestin-2 |
| 7 | Mouse wild-type arrestin-3 |
| 8 | Rat wild-type arrestin-3 |
| 9 | Bovine wild-type arrestin-3 |
| 10 | Mouse wild-type arrestin-2 |
| 11 | Rat wild-type arrestin-2 |
| 12 | Bovine wild-type arrestin-2 |
| 13 | Arrestin-2 double mutant containing T298A and I386A |
| 14 | Arrestin-2 triple mutant containing T298A, I386A and R165A |
| 15 | Arrestin-2 triple mutant containing T298A, I386A and D297A |
| 16 | Arrestin-2 triple mutant containing T298A, I386A and R393A |

EXAMPLES

Example 1—Recruitment of Wild-Type Arrestin-3 and Arrestin-3 Double and Triple Mutants to the β2-Adrenergic Receptor (β2AR, B2AR) in a Bioluminescence Resonance Energy Transfer (BRET) Assay

Materials & Methods

HE position R166A, D298, and R393 cells were seeded onto poly-L-lysine coated, white, 96-well plates at a density of ~25,000 cells per well. 24 h later cells were transiently co-transfected with a BRET donor construct (90 ng/well of RLuc8β2AR) and with 10 ng of a BRET acceptor construct (10 ng/well of GFP-arrestin-3 WT or mutant A, B, C or D) using Lipofectamine 2000 (ThermoFisher). The day following transfection, cell culture medium was exchanged with fresh medium. Another 24 h later cell culture medium was replaced with assay buffer (HBSS+20 mM HEPES and pH 7.4) and cells were treated with 5 μM cell-permeable substrate Coelenterazine 400A (Cayman Chemical), which is catalysed by the BRET donor RLuc8, resulting in the emission of light ($\lambda_{max}$=410 nm). BRET measurement was performed in a plate reader PheraStar FSX (BMG Biotech) with the optical module (BRET2 plus, 515-30, 410-80). At t=4.5 min, isoproterenol (Tocris Bioscience) was added at increasing concentrations to the cells (from 10 pM to 10 μM). BRET ratio was determined by calculating the ratio of the light intensity emitted by the GFP (515 nm) over the light intensity emitted by the Rluc8/Coelenterazine 400A (410 nm). BRET ratio baseline (before isoproterenol stimulation) was subtracted and area under curve (AUC) (19.5 min of isoproterenol stimulation) was calculated and plotted versus the isoproterenol concentrations. The BRET signals are expressed as percent of recruitment of GFP-arrestin-3 WT (set at 100%) and potency ($pEC_{50}$±SD) and efficacy ($E_{max}$±SD) were calculated from the non-linear regression in GraphPad Prism 7.04 Software (San Diego, California, USA). The maximal efficacy ($E_{max}$) was normalized for all mutants to their respective WT arrestin-3, 10 μM isoproterenol condition (set to 100%). The coefficient of determination $R^2$ can range between 0 and 1 and represents the quality of the fitting between the experimental values (marks, FIG. 1) and the non-linear regression analysis (curves, FIG. 1). Experiments were performed in technical duplicates in two independent experiments.

Results

Figures 1, 2:
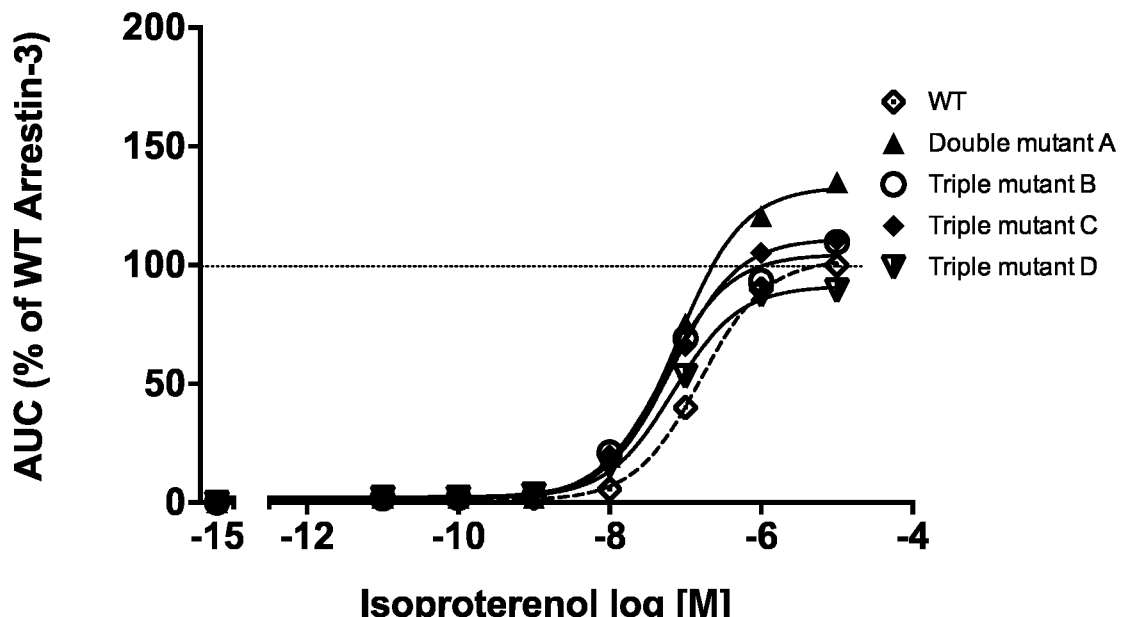
FIG. 1: Classical arrestin recruitment assay of arrestin-3 mutants to B2AR based on Bioluminescence Resonance Energy Transfer (BRET) was performed to compare the recruitment efficiency of the novel arrestin-3 mutants. The concentration-response curves of isoproterenol-induced recruitment of the wild-type arrestin-3 and the arrestin-3 mutants A, B, C and D to β2AR is shown.
FIG. 2: Protein sequence alignment of wild-type arrestin-3 (Query) to the triple mutant B with T299A, I386A and R166A (Sbjct) using the online tool Protein BLAST/blastp algorithm (matrix BLOSUM62, conditional compositional score matrix adjustment, National Center for Biotechnology Information). Mutations R166A, T299A and I386A are represented by blanks. The amino acid number is shifted by one amino acid because the start codon (ATG, methionine) has been excluded in this representation.

An arrestin recruitment assay based on Bioluminescence Resonance Energy Transfer (BRET) was performed to compare the recruitment efficiencies of arrestin-3 double and triple mutants with wild-type arrestin-3 towards B2AR. The concentration-response curves of isoproterenol-induced recruitment of the respective arrestins are shown in FIG. 1. The double mutant A (black triangle), the triple mutant B (open black circle) and C (closed black diamond) all show an increased recruitment efficacy to B2AR compared to the unmodified arrestin-3 (wild-type arrestin-3, half-filled squares). Furthermore, mutants tested were more potently recruited to the B2AR than the unmodified arrestin-3 (see also Table 1). This clearly indicates that the amino acids that were replaced in SEQ ID NO: 1 by alanine at amino acid positions T299A, I386A, R166A, D298A, and R393A play an important role in the interaction of arrestin-3 and B2AR.

The recruitment responses can be defined by two pharmacological parameters: potency and efficacy. In general, efficacy ($E_{max}$) is a measure of the maximum effect that is expected from a compound/drug. Potency is generally a measure of a compound activity and is defined as the amount of the compound required to produce an effect of given intensity. Potency is often given as the $EC_{50}$ value, which defines the amount of compound required to produce 50% of that compound's maximal effect. For simpler illustration, the $pEC_{50}$ value, which is the negative logarithm of the $EC_{50}$ in molar concentrations, is shown.

In the arrestin recruitment assay, $E_{max}$ describes the maximum amount of the isoproterenol-induced recruitment of wild-type or mutant arrestin-3 proteins to the B2AR. $pEC_{50}$ defines the isoproterenol-concentration that is required to give the half-maximal effect of the arrestin recruitment to B2AR. The $pEC_{50}$ and $E_{max}$ values of wild-type and double and triple arrestin-3 mutants recruitment to β2AR are shown in Table 1. The potency ($pEC_{50}$) represents the molar concentration of isoproterenol necessary to obtain half of the total recruitment of arrestin-3 or efficiency ($E_{max}$) for each arrestin. The measured potency for WT arrestin-3 is at 6.8±0.02 or 158.5 nM and for double mutant B at 7.3±0.06 or 50.1 nM. The double mutant A shows the highest recruitment response ($pEC_{50}$=7.1±0.03, $E_{max}$ 131.5±1.82). Compared to the wild-type arrestin-3, this mutant displays an about 30% increased efficacy in arrestin recruitment.

TABLE 1

$pEC_{50}$ values and $E_{max}$ values of wild-type arrestin-3 and arrestin-3 mutant A, B, C and D

| Arrestin | Potency ($pEC_{50}$ ± Std. error) | Efficacy ($E_{max}$ ± Std. error) in %, normalized to WT |
|---|---|---|
| Human wild-type arrestin-3 (SEQ ID NO: 1) | 6.8 ± 0.02 | 101.6 ± 0.92 |
| Double mutant A (SEQ ID NO: 2): T299A + I386A | 7.1 ± 0.03 | 131.5 ± 1.82 |
| Triple mutant B (SEQ ID NO: 3): T299A + I386A + R166A | 7.3 ± 0.06 | 103.0 ± 2.53 |
| Triple mutant C SEQ ID NO: 4): T299A + I386A + D298A | 7.2 ± 0.04 | 108.9 ± 1.84 |
| Triple mutant D (SEQ ID NO: 5): T299A + I386A + R393A | 7.2 ± 0.03 | 89.2 ± 1.23 |

Discussion

The inventors developed arrestin-3 mutants that display both higher recruitment efficacies and potencies to the B2AR when compared to wild-type arrestin-3 (see Table 1 and Figure), among them one with 30% increased recruitment efficiency (double mutant A). The inventors concluded that by replacing amino acids, e.g. by alanine or other amino acids, at certain positions, the arrestin-3 mutants are "pre-activated" and exhibit a different basal conformation than wild-type arrestin-3 before being recruited to the receptor. In other words, the mechanism of activation for arrestin-3 mutants is less energy demanding than for the unmodified arrestin wild-type proteins. The inventors postulate that the recruitment of the arrestins to β2AR is facilitated through removing this extra activation step. This will enable to detect arrestin recruitment responses to GPCRs that display low arrestin recruitment abilities, for example with GPCRs of the class A, which are known to only undergo weak and transient interactions with arrestin and for which it can be challenging to measure arrestin recruitment responses. Additionally, this novel "stronger arrestin recruiters" can be used to stabilize the β2AR or any other GPCRs in order to facilitate purification or structure elucidation, e.g. by crystallization or by other means, of the GPCR, especially in its active conformation, as GPCR alone or as GPCR-arrestin complex.

Example 2—Monitoring of Expression Level of Mutants Arrestin-3

Materials & Methods

According to the protocol of Example 1, arrestin-3 mutants were fused to an eGFP probe. Expression levels of the constructs were determined by measuring GFP fluorescence in a plate reader (e.g. prior to the BRET measurement) using the optic module FI 485 520.

Results

All arrestin-3 mutants are less expressed in cells (from 26% to 55%) compared to WT arrestin-3 as shown in table 3. In contrary to the BRET assay, GFP fluorescence was induced by lamp flashes at 485 nm and measured for each well in the same plate reader. Values were averaged in the two assays and normalized to WT. Despite a consistent lower expression of the arrestin-3 mutants in human HEK293 cells (ranging from 40% to 65% compared to WT arrestin-3, see Table 3), a stronger recruitment to β2AR was still observed with the arrestin-3 mutants. Taking this factor into account, the actual strength of the protein-protein interaction of the arrestin-3 mutant of the invention should exceed the experimental values given by the BRET assay, i.e. the recruitment capacity of the arrestin-3 mutants to B2AR seems to be even higher if the values are corrected for their lower expression level.

DISCUSSION

Protein expression is not predictable in cells. For example, adding 2 alanine mutations to WT arrestin-3 has decreased by 74% expression in double mutant A but another mutation in triple mutant C increased expression from 36% to 55%.

Measuring expression levels in cells is essential when analyzing protein-protein recruitment as strict protein-protein affinity is correlated to potency, efficacy and also expression level. Despite a lower expression profile in arrestin-3 mutants, a higher recruitment profile was detected for mutants A, B and C. Apparent β2AR-arrestin-3 mutant complex affinities will thus be exacerbated in crystallographic studies as they are performed in stoichiometric conditions.

TABLE 2

Expression levels of mutant arrestin-3

| | GFP levels compared to WT (%) |
|---|---|
| WT arrestin-3 | 100% |
| Double mutant A | 36% |
| Triple mutant B | 35% |
| Triple mutant C | 55% |
| Triple mutant D | 26% |

---

The invention claimed is:

1. A mutant human arrestin-3 wherein: (a) said mutant stabilizes a complex of GPCR and said arrestin-3 mutants, (b) there is increased recruitment of ligand to GPCRs as compared to a parent beta-arrestin, wherein said parent beta-arrestin is a naturally occurring human arrestin-3, and (c) independently at least two amino acids are mutated as compared to a parent beta-arrestin, wherein said parent beta-arrestin is a naturally occurring human arrestin-3, and wherein: (i) a first of said at least two mutated amino acids is located at an amino acid position which corresponds to I386 in human arrestin-3 of SEQ ID NO: 1; and (ii) a second of said at least two mutated amino acids is located at an amino acid position which corresponds to T299 in the human arrestin-3 of SEQ ID NO: 1 and (d) wherein the mutant human arrestin-3 is mutated by an exchange of an amino acid by a different amino acid, the different amino acid being selected from the group consisting of glycine, 2-aminobutyric acid, allo-isoleucine, isoleucine, leucine, norleucine, norvaline, and valine.

2. The mutant human arrestin-3 according to claim 1, wherein in said mutant human arrestin-3 at least three amino acids are independently mutated as compared to said parent beta-arrestin.

3. The mutant human arrestin-3 according to claim 2, wherein the third amino acid of said at least three mutated amino acids is located at an amino acid position which corresponds to an amino acid position selected from the group consisting of R166, D298, and R393 in the human arrestin-3 of SEQ ID NO: 1.

4. The mutant human arrestin-3 according to claim 1, wherein said parent beta-arrestin has the amino acid sequence of SEQ ID NO: 1.

5. The mutant human arrestin-3 according to claim 1, wherein independently at least two and at most 40 amino acid positions are mutated as compared to said parent beta-arrestin.

6. The mutant human arrestin-3 according to claim 1, wherein independently at least two and no more than 20 amino acid positions, or 10 amino acid positions, or 5 amino acid positions are mutated as compared to said parent beta-arrestin.

7. The mutant human arrestin-3 according to claim 1, wherein independently at least two and at most 4 amino acid positions, or at least two and at most 3 amino acid positions, are mutated as compared to said parent beta-arrestin.

8. The mutant human arrestin-3 according to claim 1, wherein the different amino acid is selected from the group consisting of glycine, leucine, isoleucine, and valine.

9. A mutant human arrestin-3 which comprises an amino acid sequence selected from the group consisting of SEQ ID NO: 2, SEQ ID NO: 3, SEQ ID NO: 4, and SEQ ID NO: 5, wherein (a) said mutant stabilizes a complex of GPCR and said arrestin-3 mutants and (b) there is increased recruitment of ligand to GPCRs as compared to a parent beta-arrestin, wherein said parent beta-arrestin is a naturally occurring human arrestin-3.

10. A complex of the mutant human arrestin-3 of claim 1 and a G protein-coupled receptor (GPCR).

11. The complex according to claim 10, wherein the GPCR is a beta-adrenergic receptor (βAR).

12. A vector encoding the mutant human arrestin-3 according to claim 1.

13. A complex of the mutant human arrestin-3 of claim 9 and a G protein-coupled receptor (GPCR).

14. The complex according to claim 13, wherein the GPCR is a beta-adrenergic receptor (BAR).

15. A vector encoding the mutant human arrestin-3 according to claim 9.

\* \* \* \* \*

SEQUENCE LISTING

```
<160> NUMBER OF SEQ ID NOS: 16

<210> SEQ ID NO 1
<211> LENGTH: 409
<212> TYPE: PRT
<213> ORGANISM: Homo sapiens

<400> SEQUENCE: 1

Met Gly Glu Lys Pro Gly Thr Arg Val Phe Lys Lys Ser Ser Pro Asn
1               5                   10                  15

Cys Lys Leu Thr Val Tyr Leu Gly Lys Arg Asp Phe Val Asp His Leu
            20                  25                  30

Asp Lys Val Asp Pro Val Asp Gly Val Val Leu Val Asp Pro Asp Tyr
        35                  40                  45

Leu Lys Asp Arg Lys Val Phe Val Thr Leu Thr Cys Ala Phe Arg Tyr
    50                  55                  60

Gly Arg Glu Asp Leu Asp Val Leu Gly Leu Ser Phe Arg Lys Asp Leu
65                  70                  75                  80

Phe Ile Ala Thr Tyr Gln Ala Phe Pro Pro Val Pro Asn Pro Pro Arg
                85                  90                  95

Pro Pro Thr Arg Leu Gln Asp Arg Leu Leu Arg Lys Leu Gly Gln His
                100                 105                 110
```

```
Ala His Pro Phe Phe Phe Thr Ile Pro Gln Asn Leu Pro Cys Ser Val
            115                 120                 125

Thr Leu Gln Pro Gly Pro Glu Asp Thr Gly Lys Ala Cys Gly Val Asp
130                 135                 140

Phe Glu Ile Arg Ala Phe Cys Ala Lys Ser Leu Glu Glu Lys Ser His
145                 150                 155                 160

Lys Arg Asn Ser Val Arg Leu Val Ile Arg Lys Val Gln Phe Ala Pro
                165                 170                 175

Glu Lys Pro Gly Pro Gln Pro Ser Ala Glu Thr Thr Arg His Phe Leu
            180                 185                 190

Met Ser Asp Arg Ser Leu His Leu Glu Ala Ser Leu Asp Lys Glu Leu
            195                 200                 205

Tyr Tyr His Gly Glu Pro Leu Asn Val Asn Val His Val Thr Asn Asn
            210                 215                 220

Ser Thr Lys Thr Val Lys Lys Ile Lys Val Ser Val Arg Gln Tyr Ala
225                 230                 235                 240

Asp Ile Cys Leu Phe Ser Thr Ala Gln Tyr Lys Cys Pro Val Ala Gln
                245                 250                 255

Leu Glu Gln Asp Asp Gln Val Ser Pro Ser Ser Thr Phe Cys Lys Val
            260                 265                 270

Tyr Thr Ile Thr Pro Leu Leu Ser Asp Asn Arg Glu Lys Arg Gly Leu
            275                 280                 285

Ala Leu Asp Gly Lys Leu Lys His Glu Asp Thr Asn Leu Ala Ser Ser
            290                 295                 300

Thr Ile Val Lys Glu Gly Ala Asn Lys Glu Val Leu Gly Ile Leu Val
305                 310                 315                 320

Ser Tyr Arg Val Lys Val Lys Leu Val Val Ser Arg Gly Gly Asp Val
                325                 330                 335

Ser Val Glu Leu Pro Phe Val Leu Met His Pro Lys Pro His Asp His
            340                 345                 350

Ile Pro Leu Pro Arg Pro Gln Ser Ala Ala Pro Glu Thr Asp Val Pro
            355                 360                 365

Val Asp Thr Asn Leu Ile Glu Phe Asp Thr Asn Tyr Ala Thr Asp Asp
370                 375                 380

Asp Ile Val Phe Glu Asp Phe Ala Arg Leu Arg Leu Lys Gly Met Lys
385                 390                 395                 400

Asp Asp Asp Tyr Asp Asp Gln Leu Cys
                405

<210> SEQ ID NO 2
<211> LENGTH: 409
<212> TYPE: PRT
<213> ORGANISM: Artificial Sequence
<220> FEATURE:
<223> OTHER INFORMATION: Arrestin-3 double mutant A containing T299A and
      I386A

<400> SEQUENCE: 2

Met Gly Glu Lys Pro Gly Thr Arg Val Phe Lys Lys Ser Ser Pro Asn
1               5                   10                  15

Cys Lys Leu Thr Val Tyr Leu Gly Lys Arg Asp Phe Val Asp His Leu
                20                  25                  30

Asp Lys Val Asp Pro Val Asp Gly Val Val Leu Val Asp Pro Asp Tyr
            35                  40                  45

Leu Lys Asp Arg Lys Val Phe Val Thr Leu Thr Cys Ala Phe Arg Tyr
50                  55                  60
```

Gly Arg Glu Asp Leu Asp Val Leu Gly Leu Ser Phe Arg Lys Asp Leu
65                  70                  75                  80

Phe Ile Ala Thr Tyr Gln Ala Phe Pro Pro Val Pro Asn Pro Pro Arg
                85                  90                  95

Pro Pro Thr Arg Leu Gln Asp Arg Leu Leu Arg Lys Leu Gly Gln His
            100                 105                 110

Ala His Pro Phe Phe Phe Thr Ile Pro Gln Asn Leu Pro Cys Ser Val
            115                 120                 125

Thr Leu Gln Pro Gly Pro Glu Asp Thr Gly Lys Ala Cys Gly Val Asp
130                 135                 140

Phe Glu Ile Arg Ala Phe Cys Ala Lys Ser Leu Glu Glu Lys Ser His
145                 150                 155                 160

Lys Arg Asn Ser Val Arg Leu Val Ile Arg Lys Val Gln Phe Ala Pro
                165                 170                 175

Glu Lys Pro Gly Pro Gln Pro Ser Ala Glu Thr Thr Arg His Phe Leu
            180                 185                 190

Met Ser Asp Arg Ser Leu His Leu Glu Ala Ser Leu Asp Lys Glu Leu
            195                 200                 205

Tyr Tyr His Gly Glu Pro Leu Asn Val Asn Val His Val Thr Asn Asn
210                 215                 220

Ser Thr Lys Thr Val Lys Lys Ile Lys Val Ser Val Arg Gln Tyr Ala
225                 230                 235                 240

Asp Ile Cys Leu Phe Ser Thr Ala Gln Tyr Lys Cys Pro Val Ala Gln
                245                 250                 255

Leu Glu Gln Asp Asp Gln Val Ser Pro Ser Ser Thr Phe Cys Lys Val
            260                 265                 270

Tyr Thr Ile Thr Pro Leu Leu Ser Asp Asn Arg Glu Lys Arg Gly Leu
            275                 280                 285

Ala Leu Asp Gly Lys Leu Lys His Glu Asp Ala Asn Leu Ala Ser Ser
290                 295                 300

Thr Ile Val Lys Glu Gly Ala Asn Lys Glu Val Leu Gly Ile Leu Val
305                 310                 315                 320

Ser Tyr Arg Val Lys Val Lys Leu Val Val Ser Arg Gly Gly Asp Val
                325                 330                 335

Ser Val Glu Leu Pro Phe Val Leu Met His Pro Lys Pro His Asp His
            340                 345                 350

Ile Pro Leu Pro Arg Pro Gln Ser Ala Ala Pro Glu Thr Asp Val Pro
            355                 360                 365

Val Asp Thr Asn Leu Ile Glu Phe Asp Thr Asn Tyr Ala Thr Asp Asp
            370                 375                 380

Asp Ala Val Phe Glu Asp Phe Ala Arg Leu Arg Leu Lys Gly Met Lys
385                 390                 395                 400

Asp Asp Asp Tyr Asp Asp Gln Leu Cys
                405

<210> SEQ ID NO 3
<211> LENGTH: 409
<212> TYPE: PRT
<213> ORGANISM: Artificial Sequence
<220> FEATURE:
<223> OTHER INFORMATION: Arrestin-3 triple mutant B containing T299A,
      I386A and R166A

<400> SEQUENCE: 3

Met Gly Glu Lys Pro Gly Thr Arg Val Phe Lys Lys Ser Ser Pro Asn

```
1               5                   10                  15
Cys Lys Leu Thr Val Tyr Leu Gly Lys Arg Asp Phe Val Asp His Leu
            20                  25                  30

Asp Lys Val Asp Pro Val Asp Gly Val Val Leu Val Asp Pro Asp Tyr
            35                  40                  45

Leu Lys Asp Arg Lys Val Phe Val Thr Leu Thr Cys Ala Phe Arg Tyr
            50                  55                  60

Gly Arg Glu Asp Leu Asp Val Leu Gly Leu Ser Phe Arg Lys Asp Leu
65                      70                  75                  80

Phe Ile Ala Thr Tyr Gln Ala Phe Pro Val Pro Asn Pro Arg
                85                  90                  95

Pro Pro Thr Arg Leu Gln Asp Arg Leu Leu Arg Lys Leu Gly Gln His
            100                 105                 110

Ala His Pro Phe Phe Thr Ile Pro Gln Asn Leu Pro Cys Ser Val
            115                 120                 125

Thr Leu Gln Pro Gly Pro Glu Asp Thr Gly Lys Ala Cys Gly Val Asp
130                     135                 140

Phe Glu Ile Arg Ala Phe Cys Ala Lys Ser Leu Glu Glu Lys Ser His
145                     150                 155                 160

Lys Arg Asn Ser Val Ala Leu Val Ile Arg Lys Val Gln Phe Ala Pro
                165                 170                 175

Glu Lys Pro Gly Pro Gln Pro Ser Ala Glu Thr Thr Arg His Phe Leu
            180                 185                 190

Met Ser Asp Arg Ser Leu His Leu Glu Ala Ser Leu Asp Lys Glu Leu
            195                 200                 205

Tyr Tyr His Gly Glu Pro Leu Asn Val Asn Val His Val Thr Asn Asn
            210                 215                 220

Ser Thr Lys Thr Val Lys Lys Ile Lys Val Ser Val Arg Gln Tyr Ala
225                     230                 235                 240

Asp Ile Cys Leu Phe Ser Thr Ala Gln Tyr Lys Cys Pro Val Ala Gln
                245                 250                 255

Leu Glu Gln Asp Asp Gln Val Ser Pro Ser Ser Thr Phe Cys Lys Val
            260                 265                 270

Tyr Thr Ile Thr Pro Leu Leu Ser Asp Asn Arg Glu Lys Arg Gly Leu
            275                 280                 285

Ala Leu Asp Gly Lys Leu Lys His Glu Asp Ala Asn Leu Ala Ser Ser
            290                 295                 300

Thr Ile Val Lys Glu Gly Ala Asn Lys Glu Val Leu Gly Ile Leu Val
305                     310                 315                 320

Ser Tyr Arg Val Lys Val Lys Leu Val Val Ser Arg Gly Gly Asp Val
                325                 330                 335

Ser Val Glu Leu Pro Phe Val Leu Met His Pro Lys Pro His Asp His
            340                 345                 350

Ile Pro Leu Pro Arg Pro Gln Ser Ala Ala Pro Glu Thr Asp Val Pro
            355                 360                 365

Val Asp Thr Asn Leu Ile Glu Phe Asp Thr Asn Tyr Ala Thr Asp Asp
            370                 375                 380

Asp Ala Val Phe Glu Asp Phe Ala Arg Leu Arg Leu Lys Gly Met Lys
385                     390                 395                 400

Asp Asp Asp Tyr Asp Asp Gln Leu Cys
                405

<210> SEQ ID NO 4
```

```
<211> LENGTH: 409
<212> TYPE: PRT
<213> ORGANISM: Artificial Sequence
<220> FEATURE:
<223> OTHER INFORMATION: Arrestin-3 triple mutant C containing T299A,
      I386A and D298A

<400> SEQUENCE: 4
```

Met Gly Glu Lys Pro Gly Thr Arg Val Phe Lys Lys Ser Ser Pro Asn
1               5                   10                  15

Cys Lys Leu Thr Val Tyr Leu Gly Lys Arg Asp Phe Val Asp His Leu
            20                  25                  30

Asp Lys Val Asp Pro Val Asp Gly Val Val Leu Val Asp Pro Asp Tyr
        35                  40                  45

Leu Lys Asp Arg Lys Val Phe Val Thr Leu Thr Cys Ala Phe Arg Tyr
    50                  55                  60

Gly Arg Glu Asp Leu Asp Val Leu Gly Leu Ser Phe Arg Lys Asp Leu
65                  70                  75                  80

Phe Ile Ala Thr Tyr Gln Ala Phe Pro Pro Val Pro Asn Pro Pro Arg
                85                  90                  95

Pro Pro Thr Arg Leu Gln Asp Arg Leu Leu Arg Lys Leu Gly Gln His
            100                 105                 110

Ala His Pro Phe Phe Phe Thr Ile Pro Gln Asn Leu Pro Cys Ser Val
        115                 120                 125

Thr Leu Gln Pro Gly Pro Glu Asp Thr Gly Lys Ala Cys Gly Val Asp
    130                 135                 140

Phe Glu Ile Arg Ala Phe Cys Ala Lys Ser Leu Glu Glu Lys Ser His
145                 150                 155                 160

Lys Arg Asn Ser Val Arg Leu Val Ile Arg Lys Val Gln Phe Ala Pro
                165                 170                 175

Glu Lys Pro Gly Pro Gln Pro Ser Ala Glu Thr Thr Arg His Phe Leu
            180                 185                 190

Met Ser Asp Arg Ser Leu His Leu Glu Ala Ser Leu Asp Lys Glu Leu
        195                 200                 205

Tyr Tyr His Gly Glu Pro Leu Asn Val Asn Val His Val Thr Asn Asn
    210                 215                 220

Ser Thr Lys Thr Val Lys Lys Ile Lys Val Ser Val Arg Gln Tyr Ala
225                 230                 235                 240

Asp Ile Cys Leu Phe Ser Thr Ala Gln Tyr Lys Cys Pro Val Ala Gln
                245                 250                 255

Leu Glu Gln Asp Asp Gln Val Ser Pro Ser Ser Thr Phe Cys Lys Val
            260                 265                 270

Tyr Thr Ile Thr Pro Leu Leu Ser Asp Asn Arg Glu Lys Arg Gly Leu
        275                 280                 285

Ala Leu Asp Gly Lys Leu Lys His Glu Ala Ala Asn Leu Ala Ser Ser
    290                 295                 300

Thr Ile Val Lys Glu Gly Ala Asn Lys Glu Val Leu Gly Ile Leu Val
305                 310                 315                 320

Ser Tyr Arg Val Lys Val Lys Leu Val Val Ser Arg Gly Gly Asp Val
                325                 330                 335

Ser Val Glu Leu Pro Phe Val Leu Met His Pro Lys Pro His Asp His
            340                 345                 350

Ile Pro Leu Pro Arg Pro Gln Ser Ala Ala Pro Glu Thr Asp Val Pro
        355                 360                 365

Val Asp Thr Asn Leu Ile Glu Phe Asp Thr Asn Tyr Ala Thr Asp Asp

```
                    370                 375                 380
Asp Ala Val Phe Glu Asp Phe Ala Arg Leu Arg Leu Lys Gly Met Lys
385                 390                 395                 400

Asp Asp Asp Tyr Asp Asp Gln Leu Cys
                405

<210> SEQ ID NO 5
<211> LENGTH: 409
<212> TYPE: PRT
<213> ORGANISM: Artificial Sequence
<220> FEATURE:
<223> OTHER INFORMATION: Arrestin-3 triple mutant D containing T299A,
      I386A and R393A

<400> SEQUENCE: 5

Met Gly Glu Lys Pro Gly Thr Arg Val Phe Lys Lys Ser Ser Pro Asn
1               5                   10                  15

Cys Lys Leu Thr Val Tyr Leu Gly Lys Arg Asp Phe Val Asp His Leu
            20                  25                  30

Asp Lys Val Asp Pro Val Asp Gly Val Val Leu Val Asp Pro Asp Tyr
        35                  40                  45

Leu Lys Asp Arg Lys Val Phe Val Thr Leu Thr Cys Ala Phe Arg Tyr
50                  55                  60

Gly Arg Glu Asp Leu Asp Val Leu Gly Leu Ser Phe Arg Lys Asp Leu
65                  70                  75                  80

Phe Ile Ala Thr Tyr Gln Ala Phe Pro Pro Val Pro Asn Pro Pro Arg
                85                  90                  95

Pro Pro Thr Arg Leu Gln Asp Arg Leu Leu Arg Lys Leu Gly Gln His
            100                 105                 110

Ala His Pro Phe Phe Phe Thr Ile Pro Gln Asn Leu Pro Cys Ser Val
        115                 120                 125

Thr Leu Gln Pro Gly Pro Glu Asp Thr Gly Lys Ala Cys Gly Val Asp
130                 135                 140

Phe Glu Ile Arg Ala Phe Cys Ala Lys Ser Leu Glu Glu Lys Ser His
145                 150                 155                 160

Lys Arg Asn Ser Val Arg Leu Val Ile Arg Lys Val Gln Phe Ala Pro
                165                 170                 175

Glu Lys Pro Gly Pro Gln Pro Ser Ala Glu Thr Thr Arg His Phe Leu
            180                 185                 190

Met Ser Asp Arg Ser Leu His Leu Glu Ala Ser Leu Asp Lys Glu Leu
        195                 200                 205

Tyr Tyr His Gly Glu Pro Leu Asn Val Asn Val His Val Thr Asn Asn
210                 215                 220

Ser Thr Lys Thr Val Lys Lys Ile Lys Val Ser Val Arg Gln Tyr Ala
225                 230                 235                 240

Asp Ile Cys Leu Phe Ser Thr Ala Gln Tyr Lys Cys Pro Val Ala Gln
                245                 250                 255

Leu Glu Gln Asp Asp Gln Val Ser Pro Ser Ser Thr Phe Cys Lys Val
            260                 265                 270

Tyr Thr Ile Thr Pro Leu Leu Ser Asp Asn Arg Glu Lys Arg Gly Leu
        275                 280                 285

Ala Leu Asp Gly Lys Leu Lys His Glu Asp Ala Asn Leu Ala Ser Ser
290                 295                 300

Thr Ile Val Lys Glu Gly Ala Asn Lys Glu Val Leu Gly Ile Leu Val
305                 310                 315                 320
```

-continued

Ser Tyr Arg Val Lys Val Lys Leu Val Val Ser Arg Gly Gly Asp Val
                325                 330                 335

Ser Val Glu Leu Pro Phe Val Leu Met His Pro Lys Pro His Asp His
            340                 345                 350

Ile Pro Leu Pro Arg Pro Gln Ser Ala Ala Pro Glu Thr Asp Val Pro
            355                 360                 365

Val Asp Thr Asn Leu Ile Glu Phe Asp Thr Asn Tyr Ala Thr Asp Asp
        370                 375                 380

Asp Ala Val Phe Glu Asp Phe Ala Ala Leu Arg Leu Lys Gly Met Lys
385                 390                 395                 400

Asp Asp Asp Tyr Asp Asp Gln Leu Cys
                405

<210> SEQ ID NO 6
<211> LENGTH: 418
<212> TYPE: PRT
<213> ORGANISM: Homo sapiens

<400> SEQUENCE: 6

Met Gly Asp Lys Gly Thr Arg Val Phe Lys Ala Ser Pro Asn Gly
1               5                   10                  15

Lys Leu Thr Val Tyr Leu Gly Lys Arg Asp Phe Val Asp His Ile Asp
                20                  25                  30

Leu Val Asp Pro Val Asp Gly Val Val Leu Val Asp Pro Glu Tyr Leu
            35                  40                  45

Lys Glu Arg Arg Val Tyr Val Thr Leu Thr Cys Ala Phe Arg Tyr Gly
        50                  55                  60

Arg Glu Asp Leu Asp Val Leu Gly Leu Thr Phe Arg Lys Asp Leu Phe
65                  70                  75                  80

Val Ala Asn Val Gln Ser Phe Pro Pro Ala Pro Glu Asp Lys Lys Pro
                85                  90                  95

Leu Thr Arg Leu Gln Glu Arg Leu Ile Lys Lys Leu Gly Glu His Ala
                100                 105                 110

Tyr Pro Phe Thr Phe Glu Ile Pro Pro Asn Leu Pro Cys Ser Val Thr
            115                 120                 125

Leu Gln Pro Gly Pro Glu Asp Thr Gly Lys Ala Cys Gly Val Asp Tyr
        130                 135                 140

Glu Val Lys Ala Phe Cys Ala Glu Asn Leu Glu Glu Lys Ile His Lys
145                 150                 155                 160

Arg Asn Ser Val Arg Leu Val Ile Arg Lys Val Gln Tyr Ala Pro Glu
                165                 170                 175

Arg Pro Gly Pro Gln Pro Thr Ala Glu Thr Thr Arg Gln Phe Leu Met
            180                 185                 190

Ser Asp Lys Pro Leu His Leu Glu Ala Ser Leu Asp Lys Glu Ile Tyr
        195                 200                 205

Tyr His Gly Glu Pro Ile Ser Val Asn Val His Val Thr Asn Asn Thr
    210                 215                 220

Asn Lys Thr Val Lys Lys Ile Lys Ile Ser Val Arg Gln Tyr Ala Asp
225                 230                 235                 240

Ile Cys Leu Phe Asn Thr Ala Gln Tyr Lys Cys Pro Val Ala Met Glu
                245                 250                 255

Glu Ala Asp Asp Thr Val Ala Pro Ser Ser Thr Phe Cys Lys Val Tyr
            260                 265                 270

Thr Leu Thr Pro Phe Leu Ala Asn Asn Arg Glu Lys Arg Gly Leu Ala
        275                 280                 285

```
Leu Asp Gly Lys Leu Lys His Glu Asp Thr Asn Leu Ala Ser Ser Thr
        290                 295                 300

Leu Leu Arg Glu Gly Ala Asn Arg Glu Ile Leu Gly Ile Ile Val Ser
305                 310                 315                 320

Tyr Lys Val Lys Val Lys Leu Val Val Ser Arg Gly Gly Leu Leu Gly
                325                 330                 335

Asp Leu Ala Ser Ser Asp Val Ala Val Glu Leu Pro Phe Thr Leu Met
                340                 345                 350

His Pro Lys Pro Lys Glu Gly Pro His Arg Glu Val Pro Glu Asn
                355                 360                 365

Glu Thr Pro Val Asp Thr Asn Leu Ile Glu Leu Asp Thr Asn Asp Asp
        370                 375                 380

Asp Ile Val Phe Glu Asp Phe Ala Arg Gln Arg Leu Lys Gly Met Lys
385                 390                 395                 400

Asp Asp Lys Glu Glu Glu Asp Gly Thr Gly Ser Pro Gln Leu Asn
                405                 410                 415

Asn Arg

<210> SEQ ID NO 7
<211> LENGTH: 410
<212> TYPE: PRT
<213> ORGANISM: Mus musculus

<400> SEQUENCE: 7

Met Gly Glu Lys Pro Gly Thr Arg Val Phe Lys Lys Ser Ser Pro Asn
1               5                   10                  15

Cys Lys Leu Thr Val Tyr Leu Gly Lys Arg Asp Phe Val Asp His Leu
            20                  25                  30

Asp Lys Val Asp Pro Val Asp Gly Val Val Leu Val Asp Pro Asp Tyr
        35                  40                  45

Leu Lys Asp Arg Lys Val Phe Val Thr Leu Thr Cys Ala Phe Arg Tyr
    50                  55                  60

Gly Arg Glu Asp Leu Asp Val Leu Gly Leu Ser Phe Arg Lys Asp Leu
65                  70                  75                  80

Phe Ile Ala Thr Tyr Gln Ala Phe Pro Pro Met Pro Asn Pro Pro Arg
            85                  90                  95

Pro Pro Thr Arg Leu Gln Asp Arg Leu Leu Lys Lys Leu Gly Gln His
            100                 105                 110

Ala His Pro Phe Phe Phe Thr Ile Pro Gln Asn Leu Pro Cys Ser Val
        115                 120                 125

Thr Leu Gln Pro Gly Pro Glu Asp Thr Gly Lys Ala Cys Gly Val Asp
    130                 135                 140

Phe Glu Ile Arg Ala Phe Cys Ala Lys Ser Ile Glu Glu Lys Ser His
145                 150                 155                 160

Lys Arg Asn Ser Val Arg Leu Ile Ile Arg Lys Val Gln Phe Ala Pro
            165                 170                 175

Glu Thr Pro Gly Pro Gln Pro Ser Ala Glu Thr Thr Arg His Phe Leu
            180                 185                 190

Met Ser Asp Arg Arg Ser Leu His Leu Glu Ala Ser Leu Asp Lys Glu
        195                 200                 205

Leu Tyr Tyr His Gly Glu Pro Leu Asn Val Asn Val His Val Thr Asn
    210                 215                 220

Asn Ser Ala Lys Thr Val Lys Lys Ile Arg Val Ser Val Arg Gln Tyr
225                 230                 235                 240
```

```
Ala Asp Ile Cys Leu Phe Ser Thr Ala Gln Tyr Lys Cys Pro Val Ala
                245                 250                 255

Gln Leu Glu Gln Asp Asp Gln Val Ser Pro Ser Ser Thr Phe Cys Lys
            260                 265                 270

Val Tyr Thr Ile Thr Pro Leu Leu Ser Asp Asn Arg Glu Lys Arg Gly
        275                 280                 285

Leu Ala Leu Asp Gly Gln Leu Lys His Glu Asp Thr Asn Leu Ala Ser
    290                 295                 300

Ser Thr Ile Val Lys Glu Gly Ala Asn Lys Glu Val Leu Gly Ile Leu
305                 310                 315                 320

Val Ser Tyr Arg Val Lys Val Lys Leu Val Val Ser Arg Gly Gly Asp
                325                 330                 335

Val Ser Val Glu Leu Pro Phe Val Leu Met His Pro Lys Pro His Asp
            340                 345                 350

His Ile Thr Leu Pro Arg Pro Gln Ser Ala Pro Arg Glu Thr Asp Val
        355                 360                 365

Pro Val Asp Thr Asn Leu Ile Glu Phe Asp Thr Asn Tyr Ala Thr Asp
    370                 375                 380

Asp Asp Ile Val Phe Glu Asp Phe Ala Arg Leu Arg Leu Lys Gly Met
385                 390                 395                 400

Lys Asp Asp Asp Cys Asp Asp Gln Phe Cys
                405                 410

<210> SEQ ID NO 8
<211> LENGTH: 410
<212> TYPE: PRT
<213> ORGANISM: Rattus norvegicus

<400> SEQUENCE: 8

Met Gly Glu Lys Pro Gly Thr Arg Val Phe Lys Lys Ser Ser Pro Asn
1               5                   10                  15

Cys Lys Leu Thr Val Tyr Leu Gly Lys Arg Asp Phe Val Asp His Leu
                20                  25                  30

Asp Lys Val Asp Pro Val Asp Gly Val Val Leu Val Asp Pro Asp Tyr
            35                  40                  45

Leu Lys Asp Arg Lys Val Phe Val Thr Leu Thr Cys Ala Phe Arg Tyr
    50                  55                  60

Gly Arg Glu Asp Leu Asp Val Leu Gly Leu Ser Phe Arg Lys Asp Leu
65                  70                  75                  80

Phe Ile Ala Thr Tyr Gln Ala Phe Pro Pro Met Pro Asn Pro Pro Arg
                85                  90                  95

Pro Pro Thr Arg Leu Gln Asp Arg Leu Leu Lys Lys Leu Gly Gln His
            100                 105                 110

Ala His Pro Phe Phe Phe Thr Ile Pro Gln Asn Leu Pro Cys Ser Val
    115                 120                 125

Thr Leu Gln Pro Gly Pro Glu Asp Thr Gly Lys Ala Cys Gly Val Asp
130                 135                 140

Phe Glu Ile Arg Ala Phe Cys Ala Lys Ser Ile Glu Glu Lys Ser His
145                 150                 155                 160

Lys Arg Asn Ser Val Arg Leu Ile Ile Arg Lys Val Gln Phe Ala Pro
                165                 170                 175

Glu Thr Pro Gly Pro Gln Pro Ser Ala Glu Thr Thr Arg His Phe Leu
            180                 185                 190

Met Ser Asp Arg Arg Ser Leu His Leu Glu Ala Ser Leu Asp Lys Glu
```

```
                195                 200                 205
Leu Tyr Tyr His Gly Glu Pro Leu Asn Val Asn Val His Val Thr Asn
210                 215                 220

Asn Ser Ala Lys Thr Val Lys Lys Ile Arg Val Ser Val Arg Gln Tyr
225                 230                 235                 240

Ala Asp Ile Cys Leu Phe Ser Thr Ala Gln Tyr Lys Cys Pro Val Ala
                245                 250                 255

Gln Leu Glu Gln Asp Asp Gln Val Ser Pro Ser Thr Phe Cys Lys
                260                 265                 270

Val Tyr Thr Ile Thr Pro Leu Leu Ser Asp Asn Arg Glu Lys Arg Gly
                275                 280                 285

Leu Ala Leu Asp Gly Gln Leu Lys His Glu Asp Thr Asn Leu Ala Ser
290                 295                 300

Ser Thr Ile Val Lys Glu Gly Ala Asn Lys Val Leu Gly Ile Leu
305                 310                 315                 320

Val Ser Tyr Arg Val Lys Val Lys Leu Val Val Ser Arg Gly Gly Asp
                325                 330                 335

Val Ser Val Glu Leu Pro Phe Val Leu Met His Pro Lys Pro His Asp
                340                 345                 350

His Ile Thr Leu Pro Arg Pro Gln Ser Ala Pro Arg Glu Ile Asp Ile
                355                 360                 365

Pro Val Asp Thr Asn Leu Ile Glu Phe Asp Thr Asn Tyr Ala Thr Asp
370                 375                 380

Asp Asp Ile Val Phe Glu Asp Phe Ala Arg Leu Arg Leu Lys Gly Met
385                 390                 395                 400

Lys Asp Asp Asp Cys Asp Asp Gln Phe Cys
                405                 410

<210> SEQ ID NO 9
<211> LENGTH: 420
<212> TYPE: PRT
<213> ORGANISM: Bos taurus

<400> SEQUENCE: 9

Met Gly Glu Lys Pro Gly Thr Arg Val Phe Lys Lys Ser Ser Pro Asn
1               5                   10                  15

Cys Lys Leu Thr Val Tyr Leu Gly Lys Arg Asp Phe Val Asp His Leu
                20                  25                  30

Asp Lys Val Asp Pro Val Asp Gly Val Val Leu Val Asp Pro Asp Tyr
            35                  40                  45

Leu Lys Asp Arg Lys Val Phe Val Thr Leu Thr Cys Ala Phe Arg Tyr
        50                  55                  60

Gly Arg Glu Asp Leu Asp Val Leu Gly Leu Ser Phe Arg Lys Asp Leu
65                  70                  75                  80

Phe Ile Ala Asn Tyr Gln Ala Phe Pro Pro Thr Pro Asn Pro Pro Arg
                85                  90                  95

Pro Pro Thr Arg Leu Gln Glu Arg Leu Leu Arg Lys Leu Gly Gln His
                100                 105                 110

Ala His Pro Phe Phe Phe Thr Ile Pro Gln Asn Leu Pro Cys Ser Val
            115                 120                 125

Thr Leu Gln Pro Gly Pro Glu Asp Thr Gly Lys Ala Cys Gly Val Asp
        130                 135                 140

Phe Glu Ile Arg Ala Phe Cys Ala Lys Ser Leu Glu Glu Lys Ser His
145                 150                 155                 160
```

Lys Arg Asn Ser Val Arg Leu Val Ile Arg Lys Val Gln Phe Ala Pro
            165                 170                 175

Glu Lys Pro Gly Pro Gln Pro Ser Ala Glu Thr Thr Arg His Phe Leu
        180                 185                 190

Met Ser Asp Arg Ser Leu His Leu Glu Ala Ser Leu Asp Lys Glu Leu
        195                 200                 205

Tyr Tyr His Gly Glu Pro Leu Asn Val Asn Val His Val Thr Asn Asn
        210                 215                 220

Ser Thr Lys Thr Val Lys Lys Ile Lys Val Ser Val Arg Gln Tyr Ala
225                 230                 235                 240

Asp Ile Cys Leu Phe Ser Thr Ala Gln Tyr Lys Cys Pro Val Ala Gln
                245                 250                 255

Val Glu Gln Asp Asp Gln Val Ser Pro Ser Ser Thr Phe Cys Lys Val
            260                 265                 270

Tyr Thr Ile Thr Pro Leu Leu Ser Asn Asn Arg Glu Lys Arg Gly Leu
        275                 280                 285

Ala Leu Asp Gly Lys Leu Lys His Glu Asp Thr Asn Leu Ala Ser Ser
        290                 295                 300

Thr Ile Val Lys Glu Gly Ala Asn Lys Glu Val Leu Gly Ile Leu Val
305                 310                 315                 320

Ser Tyr Arg Val Lys Val Lys Leu Val Val Ser Arg Gly Gly Asp Val
                325                 330                 335

Ser Val Glu Leu Pro Phe Val Leu Met His Pro Lys Pro His Asp His
            340                 345                 350

Ile Ala Leu Pro Arg Pro Gln Ser Ala Ala Thr His Pro Pro Thr Leu
        355                 360                 365

Leu Pro Ser Ala Val Pro Glu Thr Asp Ala Pro Val Asp Thr Asn Leu
        370                 375                 380

Ile Glu Phe Glu Thr Asn Tyr Ala Thr Asp Asp Ile Val Phe Glu
385                 390                 395                 400

Asp Phe Ala Arg Leu Arg Leu Lys Gly Leu Lys Asp Glu Asp Tyr Asp
                405                 410                 415

Asp Gln Phe Cys
        420

<210> SEQ ID NO 10
<211> LENGTH: 418
<212> TYPE: PRT
<213> ORGANISM: Mus musculus

<400> SEQUENCE: 10

Met Gly Asp Lys Gly Thr Arg Val Phe Lys Lys Ala Ser Pro Asn Gly
1               5                   10                  15

Lys Leu Thr Val Tyr Leu Gly Lys Arg Asp Phe Val Asp His Ile Asp
                20                  25                  30

Leu Val Asp Pro Val Asp Gly Val Val Leu Val Asp Pro Glu Tyr Leu
            35                  40                  45

Lys Glu Arg Arg Val Tyr Val Thr Leu Thr Cys Ala Phe Arg Tyr Gly
        50                  55                  60

Arg Glu Asp Leu Asp Val Leu Gly Leu Thr Phe Arg Lys Asp Leu Phe
65                  70                  75                  80

Val Ala Asn Val Gln Ser Phe Pro Pro Ala Pro Glu Asp Lys Lys Pro
                85                  90                  95

Leu Thr Arg Leu Gln Glu Arg Leu Ile Lys Lys Leu Gly Glu His Ala
            100                 105                 110

Cys Pro Phe Thr Phe Glu Ile Pro Pro Asn Leu Pro Cys Ser Val Thr
            115                 120                 125

Leu Gln Pro Gly Pro Glu Asp Thr Gly Lys Ala Cys Gly Val Asp Tyr
130                 135                 140

Glu Val Lys Ala Phe Cys Ala Glu Asn Leu Glu Glu Lys Ile His Lys
145                 150                 155                 160

Arg Asn Ser Val Arg Leu Val Ile Arg Lys Val Gln Tyr Ala Pro Glu
                165                 170                 175

Arg Pro Gly Pro Gln Pro Thr Ala Glu Thr Thr Arg Gln Phe Leu Met
            180                 185                 190

Ser Asp Lys Pro Leu His Leu Glu Ala Ser Leu Asp Lys Glu Ile Tyr
            195                 200                 205

Tyr His Gly Glu Pro Ile Ser Val Asn Val His Val Thr Asn Asn Thr
            210                 215                 220

Asn Lys Thr Val Lys Lys Ile Lys Ile Ser Val Arg Gln Tyr Ala Asp
225                 230                 235                 240

Ile Cys Leu Phe Asn Thr Ala Gln Tyr Lys Cys Pro Val Ala Met Glu
                245                 250                 255

Glu Ala Asp Asp Asn Val Ala Pro Ser Ser Thr Phe Cys Lys Val Tyr
            260                 265                 270

Thr Leu Thr Pro Phe Leu Ala Asn Asn Arg Glu Lys Arg Gly Leu Ala
            275                 280                 285

Leu Asp Gly Lys Leu Lys His Glu Asp Thr Asn Leu Ala Ser Ser Thr
            290                 295                 300

Leu Leu Arg Glu Gly Ala Asn Arg Glu Ile Leu Gly Ile Ile Val Ser
305                 310                 315                 320

Tyr Lys Val Lys Val Lys Leu Val Val Ser Arg Gly Gly Leu Leu Gly
                325                 330                 335

Asp Leu Ala Ser Ser Asp Val Ala Val Glu Leu Pro Phe Thr Leu Met
            340                 345                 350

His Pro Lys Pro Lys Glu Glu Pro Pro His Arg Glu Val Pro Glu Ser
            355                 360                 365

Glu Thr Pro Val Asp Thr Asn Leu Ile Glu Leu Asp Thr Asn Asp Asp
            370                 375                 380

Asp Ile Val Phe Glu Asp Phe Ala Arg Gln Arg Leu Lys Gly Met Lys
385                 390                 395                 400

Asp Asp Lys Asp Glu Glu Asp Asp Gly Thr Gly Ser Pro His Leu Asn
                405                 410                 415

Asn Arg

<210> SEQ ID NO 11
<211> LENGTH: 418
<212> TYPE: PRT
<213> ORGANISM: Rattus norvegicus

<400> SEQUENCE: 11

Met Gly Asp Lys Gly Thr Arg Val Phe Lys Lys Ala Ser Pro Asn Gly
1               5                   10                  15

Lys Leu Thr Val Tyr Leu Gly Lys Arg Asp Phe Val Asp His Ile Asp
                20                  25                  30

Leu Val Asp Pro Val Asp Gly Val Val Leu Val Asp Pro Glu Tyr Leu
            35                  40                  45

Lys Glu Arg Arg Val Tyr Val Thr Leu Thr Cys Ala Phe Arg Tyr Gly
50                  55                  60

Arg Glu Asp Leu Asp Val Leu Gly Leu Thr Phe Arg Lys Asp Leu Phe
65                  70                  75                  80

Val Ala Asn Val Gln Ser Phe Pro Pro Ala Pro Glu Asp Lys Lys Pro
                85                  90                  95

Leu Thr Arg Leu Gln Glu Arg Leu Ile Lys Lys Leu Gly Glu His Ala
            100                 105                 110

Tyr Pro Phe Thr Phe Glu Ile Pro Pro Asn Leu Pro Cys Ser Val Thr
        115                 120                 125

Leu Gln Pro Gly Pro Glu Asp Thr Gly Lys Ala Cys Gly Val Asp Tyr
130                 135                 140

Glu Val Lys Ala Phe Cys Ala Glu Asn Leu Glu Lys Ile His Lys
145                 150                 155                 160

Arg Asn Ser Val Arg Leu Val Ile Arg Lys Val Gln Tyr Ala Pro Glu
                165                 170                 175

Arg Pro Gly Pro Gln Pro Thr Ala Glu Thr Thr Arg Gln Phe Leu Met
            180                 185                 190

Ser Asp Lys Pro Leu His Leu Glu Ala Ser Leu Asp Lys Glu Ile Tyr
        195                 200                 205

Tyr His Gly Glu Pro Ile Ser Val Asn Val His Val Thr Asn Asn Thr
210                 215                 220

Asn Lys Thr Val Lys Lys Ile Lys Ile Ser Val Arg Gln Tyr Ala Asp
225                 230                 235                 240

Ile Cys Leu Phe Asn Thr Ala Gln Tyr Lys Cys Pro Val Ala Met Glu
                245                 250                 255

Glu Ala Asp Asp Thr Val Ala Pro Ser Ser Thr Phe Cys Lys Val Tyr
            260                 265                 270

Thr Leu Thr Pro Phe Leu Ala Asn Asn Arg Glu Lys Arg Gly Leu Ala
        275                 280                 285

Leu Asp Gly Lys Leu Lys His Glu Asp Thr Asn Leu Ala Ser Ser Thr
290                 295                 300

Leu Leu Arg Glu Gly Ala Asn Arg Glu Ile Leu Gly Ile Ile Val Ser
305                 310                 315                 320

Tyr Lys Val Lys Val Lys Leu Val Val Ser Arg Gly Gly Leu Leu Gly
                325                 330                 335

Asp Leu Ala Ser Ser Asp Val Ala Val Glu Leu Pro Phe Thr Leu Met
            340                 345                 350

His Pro Lys Pro Lys Glu Glu Pro His Arg Glu Val Pro Glu Ser
        355                 360                 365

Glu Thr Pro Val Asp Thr Asn Leu Ile Glu Leu Asp Thr Asn Asp Asp
370                 375                 380

Asp Ile Val Phe Glu Asp Phe Ala Arg Gln Arg Leu Lys Gly Met Lys
385                 390                 395                 400

Asp Asp Lys Asp Glu Glu Asp Gly Thr Gly Ser Pro His Leu Asn
                405                 410                 415

Asn Arg

<210> SEQ ID NO 12
<211> LENGTH: 418
<212> TYPE: PRT
<213> ORGANISM: Bos taurus

<400> SEQUENCE: 12

Met Gly Asp Lys Gly Thr Arg Val Phe Lys Lys Ala Ser Pro Asn Gly
1               5                   10                  15

Lys Leu Thr Val Tyr Leu Gly Lys Arg Asp Phe Val Asp His Ile Asp
            20                  25                  30

Leu Val Glu Pro Val Asp Gly Val Leu Val Asp Pro Glu Tyr Leu
        35                  40                  45

Lys Glu Arg Arg Val Tyr Val Thr Leu Thr Cys Ala Phe Arg Tyr Gly
50                  55                  60

Arg Glu Asp Leu Asp Val Leu Gly Leu Thr Phe Arg Lys Asp Leu Phe
65                  70                  75                  80

Val Ala Asn Val Gln Ser Phe Pro Ala Pro Glu Asp Lys Lys Pro
                85                  90                  95

Leu Thr Arg Leu Gln Glu Arg Leu Ile Lys Lys Leu Gly Glu His Ala
            100                 105                 110

Tyr Pro Phe Thr Phe Glu Ile Pro Pro Asn Leu Pro Cys Ser Val Thr
            115                 120                 125

Leu Gln Pro Gly Pro Glu Asp Thr Gly Lys Ala Cys Gly Val Asp Tyr
130                 135                 140

Glu Val Lys Ala Phe Cys Ala Glu Asn Leu Glu Glu Lys Ile His Lys
145                 150                 155                 160

Arg Asn Ser Val Arg Leu Val Ile Arg Lys Val Gln Tyr Ala Pro Glu
                165                 170                 175

Arg Pro Gly Pro Gln Pro Thr Ala Glu Thr Thr Arg Gln Phe Leu Met
            180                 185                 190

Ser Asp Lys Pro Leu His Leu Glu Ala Ser Leu Asp Lys Glu Ile Tyr
            195                 200                 205

Tyr His Gly Glu Pro Ile Ser Val Asn Val His Val Thr Asn Asn Thr
            210                 215                 220

Asn Lys Thr Val Lys Lys Ile Lys Ile Ser Val Arg Gln Tyr Ala Asp
225                 230                 235                 240

Ile Cys Leu Phe Asn Thr Ala Gln Tyr Lys Cys Pro Val Ala Met Glu
                245                 250                 255

Glu Ala Asp Asp Thr Val Ala Pro Ser Ser Thr Phe Cys Lys Val Tyr
            260                 265                 270

Thr Leu Thr Pro Phe Leu Ala Asn Asn Arg Glu Lys Arg Gly Leu Ala
            275                 280                 285

Leu Asp Gly Lys Leu Lys His Glu Asp Thr Asn Leu Ala Ser Ser Thr
290                 295                 300

Leu Leu Arg Glu Gly Ala Asn Arg Glu Ile Leu Gly Ile Ile Val Ser
305                 310                 315                 320

Tyr Lys Val Lys Val Lys Leu Val Val Ser Arg Gly Gly Leu Leu Gly
                325                 330                 335

Asp Leu Ala Ser Ser Asp Val Ala Val Glu Leu Pro Phe Thr Leu Met
            340                 345                 350

His Pro Lys Pro Lys Glu Glu Pro His Arg Glu Val Pro Glu His
            355                 360                 365

Glu Thr Pro Val Asp Thr Asn Leu Ile Glu Leu Asp Thr Asn Asp Asp
            370                 375                 380

Asp Ile Val Phe Glu Asp Phe Ala Arg Gln Arg Leu Lys Gly Met Lys
385                 390                 395                 400

Asp Asp Lys Glu Glu Glu Glu Asp Gly Thr Gly Ser Pro Arg Leu Asn
                405                 410                 415

Asp Arg

<210> SEQ ID NO 13
<211> LENGTH: 418
<212> TYPE: PRT
<213> ORGANISM: Artificial Sequence
<220> FEATURE:
<223> OTHER INFORMATION: Arrestin-2 double mutant containing T298A and
      I386A

<400> SEQUENCE: 13

```
Met Gly Asp Lys Gly Thr Arg Val Phe Lys Lys Ala Ser Pro Asn Gly
1               5                   10                  15

Lys Leu Thr Val Tyr Leu Gly Lys Arg Asp Phe Val Asp His Ile Asp
            20                  25                  30

Leu Val Asp Pro Val Asp Gly Val Val Leu Val Asp Pro Glu Tyr Leu
        35                  40                  45

Lys Glu Arg Arg Val Tyr Val Thr Leu Thr Cys Ala Phe Arg Tyr Gly
    50                  55                  60

Arg Glu Asp Leu Asp Val Leu Gly Leu Thr Phe Arg Lys Asp Leu Phe
65                  70                  75                  80

Val Ala Asn Val Gln Ser Phe Pro Pro Ala Pro Glu Asp Lys Lys Pro
                85                  90                  95

Leu Thr Arg Leu Gln Glu Arg Leu Ile Lys Lys Leu Gly Glu His Ala
            100                 105                 110

Tyr Pro Phe Thr Phe Glu Ile Pro Pro Asn Leu Pro Cys Ser Val Thr
        115                 120                 125

Leu Gln Pro Gly Pro Glu Asp Thr Gly Lys Ala Cys Gly Val Asp Tyr
    130                 135                 140

Glu Val Lys Ala Phe Cys Ala Glu Asn Leu Glu Glu Lys Ile His Lys
145                 150                 155                 160

Arg Asn Ser Val Arg Leu Val Ile Arg Lys Val Gln Tyr Ala Pro Glu
                165                 170                 175

Arg Pro Gly Pro Gln Pro Thr Ala Glu Thr Thr Arg Gln Phe Leu Met
            180                 185                 190

Ser Asp Lys Pro Leu His Leu Glu Ala Ser Leu Asp Lys Glu Ile Tyr
        195                 200                 205

Tyr His Gly Glu Pro Ile Ser Val Asn Val His Val Thr Asn Asn Thr
    210                 215                 220

Asn Lys Thr Val Lys Lys Ile Lys Ile Ser Val Arg Gln Tyr Ala Asp
225                 230                 235                 240

Ile Cys Leu Phe Asn Thr Ala Gln Tyr Lys Cys Pro Val Ala Met Glu
                245                 250                 255

Glu Ala Asp Asp Thr Val Ala Pro Ser Ser Thr Phe Cys Lys Val Tyr
            260                 265                 270

Thr Leu Thr Pro Phe Leu Ala Asn Asn Arg Glu Lys Arg Gly Leu Ala
        275                 280                 285

Leu Asp Gly Lys Leu Lys His Glu Asp Ala Asn Leu Ala Ser Ser Thr
    290                 295                 300

Leu Leu Arg Glu Gly Ala Asn Arg Glu Ile Leu Gly Ile Ile Val Ser
305                 310                 315                 320

Tyr Lys Val Lys Val Lys Leu Val Val Ser Arg Gly Gly Leu Leu Gly
                325                 330                 335

Asp Leu Ala Ser Ser Asp Val Ala Val Glu Leu Pro Phe Thr Leu Met
            340                 345                 350

His Pro Lys Pro Lys Glu Glu Pro Pro His Arg Glu Val Pro Glu Asn
        355                 360                 365
```

```
Glu Thr Pro Val Asp Thr Asn Leu Ile Glu Leu Asp Thr Asn Asp Asp
370                 375                 380

Asp Ala Val Phe Glu Asp Phe Ala Arg Gln Arg Leu Lys Gly Met Lys
385                 390                 395                 400

Asp Asp Lys Glu Glu Glu Asp Gly Thr Gly Ser Pro Gln Leu Asn
                405                 410                 415

Asn Arg

<210> SEQ ID NO 14
<211> LENGTH: 418
<212> TYPE: PRT
<213> ORGANISM: Artificial Sequence
<220> FEATURE:
<223> OTHER INFORMATION: Arrestin-2 triple mutant containing T298A,
      I386A and R165A

<400> SEQUENCE: 14

Met Gly Asp Lys Gly Thr Arg Val Phe Lys Lys Ala Ser Pro Asn Gly
1               5                   10                  15

Lys Leu Thr Val Tyr Leu Gly Lys Arg Asp Phe Val Asp His Ile Asp
                20                  25                  30

Leu Val Asp Pro Val Asp Gly Val Val Leu Val Asp Pro Glu Tyr Leu
            35                  40                  45

Lys Glu Arg Arg Val Tyr Val Thr Leu Thr Cys Ala Phe Arg Tyr Gly
50                  55                  60

Arg Glu Asp Leu Asp Val Leu Gly Leu Thr Phe Arg Lys Asp Leu Phe
65                  70                  75                  80

Val Ala Asn Val Gln Ser Phe Pro Pro Ala Pro Glu Asp Lys Lys Pro
                85                  90                  95

Leu Thr Arg Leu Gln Glu Arg Leu Ile Lys Lys Leu Gly Glu His Ala
            100                 105                 110

Tyr Pro Phe Thr Phe Glu Ile Pro Pro Asn Leu Pro Cys Ser Val Thr
        115                 120                 125

Leu Gln Pro Gly Pro Glu Asp Thr Gly Lys Ala Cys Gly Val Asp Tyr
130                 135                 140

Glu Val Lys Ala Phe Cys Ala Glu Asn Leu Glu Glu Lys Ile His Lys
145                 150                 155                 160

Arg Asn Ser Val Ala Leu Val Ile Arg Lys Val Gln Tyr Ala Pro Glu
                165                 170                 175

Arg Pro Gly Pro Gln Pro Thr Ala Glu Thr Thr Arg Gln Phe Leu Met
            180                 185                 190

Ser Asp Lys Pro Leu His Leu Glu Ala Ser Leu Asp Lys Glu Ile Tyr
        195                 200                 205

Tyr His Gly Glu Pro Ile Ser Val Asn Val His Val Thr Asn Asn Thr
210                 215                 220

Asn Lys Thr Val Lys Lys Ile Lys Ile Ser Val Arg Gln Tyr Ala Asp
225                 230                 235                 240

Ile Cys Leu Phe Asn Thr Ala Gln Tyr Lys Cys Pro Val Ala Met Glu
                245                 250                 255

Glu Ala Asp Asp Thr Val Ala Pro Ser Ser Thr Phe Cys Lys Val Tyr
            260                 265                 270

Thr Leu Thr Pro Phe Leu Ala Asn Asn Arg Glu Lys Arg Gly Leu Ala
        275                 280                 285

Leu Asp Gly Lys Leu Lys His Glu Asp Ala Asn Leu Ala Ser Ser Thr
290                 295                 300
```

```
Leu Leu Arg Glu Gly Ala Asn Arg Glu Ile Leu Gly Ile Ile Val Ser
305                 310                 315                 320

Tyr Lys Val Lys Val Lys Leu Val Val Ser Arg Gly Gly Leu Leu Gly
                325                 330                 335

Asp Leu Ala Ser Ser Asp Val Ala Val Glu Leu Pro Phe Thr Leu Met
            340                 345                 350

His Pro Lys Pro Lys Glu Glu Pro His Arg Glu Val Pro Glu Asn
        355                 360                 365

Glu Thr Pro Val Asp Thr Asn Leu Ile Glu Leu Asp Thr Asn Asp Asp
    370                 375                 380

Asp Ala Val Phe Glu Asp Phe Ala Arg Gln Arg Leu Lys Gly Met Lys
385                 390                 395                 400

Asp Asp Lys Glu Glu Glu Asp Gly Thr Gly Ser Pro Gln Leu Asn
                405                 410                 415

Asn Arg

<210> SEQ ID NO 15
<211> LENGTH: 418
<212> TYPE: PRT
<213> ORGANISM: Artificial Sequence
<220> FEATURE:
<223> OTHER INFORMATION: Arrestin-2 triple mutant containing T298A,
      I386A and D297A

<400> SEQUENCE: 15

Met Gly Asp Lys Gly Thr Arg Val Phe Lys Lys Ala Ser Pro Asn Gly
1               5                   10                  15

Lys Leu Thr Val Tyr Leu Gly Lys Arg Asp Phe Val Asp His Ile Asp
            20                  25                  30

Leu Val Asp Pro Val Asp Gly Val Val Leu Val Asp Pro Glu Tyr Leu
        35                  40                  45

Lys Glu Arg Arg Val Tyr Val Thr Leu Thr Cys Ala Phe Arg Tyr Gly
    50                  55                  60

Arg Glu Asp Leu Asp Val Leu Gly Leu Thr Phe Arg Lys Asp Leu Phe
65                  70                  75                  80

Val Ala Asn Val Gln Ser Phe Pro Pro Ala Pro Glu Asp Lys Lys Pro
                85                  90                  95

Leu Thr Arg Leu Gln Glu Arg Leu Ile Lys Lys Leu Gly Glu His Ala
            100                 105                 110

Tyr Pro Phe Thr Phe Glu Ile Pro Pro Asn Leu Pro Cys Ser Val Thr
        115                 120                 125

Leu Gln Pro Gly Pro Glu Asp Thr Gly Lys Ala Cys Gly Val Asp Tyr
130                 135                 140

Glu Val Lys Ala Phe Cys Ala Glu Asn Leu Glu Glu Lys Ile His Lys
145                 150                 155                 160

Arg Asn Ser Val Arg Leu Val Ile Arg Lys Val Gln Tyr Ala Pro Glu
                165                 170                 175

Arg Pro Gly Pro Gln Pro Thr Ala Glu Thr Thr Arg Gln Phe Leu Met
            180                 185                 190

Ser Asp Lys Pro Leu His Leu Glu Ala Ser Leu Asp Lys Glu Ile Tyr
        195                 200                 205

Tyr His Gly Glu Pro Ile Ser Val Asn Val His Val Thr Asn Asn Thr
    210                 215                 220

Asn Lys Thr Val Lys Lys Ile Lys Ile Ser Val Arg Gln Tyr Ala Asp
225                 230                 235                 240
```

```
Ile Cys Leu Phe Asn Thr Ala Gln Tyr Lys Cys Pro Val Ala Met Glu
                245                 250                 255

Glu Ala Asp Asp Thr Val Ala Pro Ser Ser Thr Phe Cys Lys Val Tyr
            260                 265                 270

Thr Leu Thr Pro Phe Leu Ala Asn Asn Arg Glu Lys Arg Gly Leu Ala
        275                 280                 285

Leu Asp Gly Lys Leu Lys His Glu Ala Ala Asn Leu Ala Ser Ser Thr
    290                 295                 300

Leu Leu Arg Glu Gly Ala Asn Arg Glu Ile Leu Gly Ile Ile Val Ser
305                 310                 315                 320

Tyr Lys Val Lys Val Lys Leu Val Val Ser Arg Gly Gly Leu Leu Gly
                325                 330                 335

Asp Leu Ala Ser Ser Asp Val Ala Val Glu Leu Pro Phe Thr Leu Met
            340                 345                 350

His Pro Lys Pro Lys Glu Glu Pro His Arg Glu Val Pro Glu Asn
        355                 360                 365

Glu Thr Pro Val Asp Thr Asn Leu Ile Glu Leu Asp Thr Asn Asp Asp
    370                 375                 380

Asp Ala Val Phe Glu Asp Phe Ala Arg Gln Arg Leu Lys Gly Met Lys
385                 390                 395                 400

Asp Asp Lys Glu Glu Glu Asp Gly Thr Gly Ser Pro Gln Leu Asn
                405                 410                 415

Asn Arg
```

<210> SEQ ID NO 16
<211> LENGTH: 418
<212> TYPE: PRT
<213> ORGANISM: Artificial Sequence
<220> FEATURE:
<223> OTHER INFORMATION: Arrestin-2 triple mutant containing T298A,
      I386A and R393A

<400> SEQUENCE: 16

```
Met Gly Asp Lys Gly Thr Arg Val Phe Lys Lys Ala Ser Pro Asn Gly
1               5                   10                  15

Lys Leu Thr Val Tyr Leu Gly Lys Arg Asp Phe Val Asp His Ile Asp
                20                  25                  30

Leu Val Asp Pro Val Asp Gly Val Val Leu Val Asp Pro Glu Tyr Leu
            35                  40                  45

Lys Glu Arg Arg Val Tyr Val Thr Leu Thr Cys Ala Phe Arg Tyr Gly
    50                  55                  60

Arg Glu Asp Leu Asp Val Leu Gly Leu Thr Phe Arg Lys Asp Leu Phe
65                  70                  75                  80

Val Ala Asn Val Gln Ser Phe Pro Pro Ala Pro Glu Asp Lys Lys Pro
                85                  90                  95

Leu Thr Arg Leu Gln Glu Arg Leu Ile Lys Lys Leu Gly Glu His Ala
            100                 105                 110

Tyr Pro Phe Thr Phe Glu Ile Pro Pro Asn Leu Pro Cys Ser Val Thr
    115                 120                 125

Leu Gln Pro Gly Pro Glu Asp Thr Gly Lys Ala Cys Gly Val Asp Tyr
    130                 135                 140

Glu Val Lys Ala Phe Cys Ala Glu Asn Leu Glu Glu Lys Ile His Lys
145                 150                 155                 160

Arg Asn Ser Val Arg Leu Val Ile Arg Lys Val Gln Tyr Ala Pro Glu
                165                 170                 175
```

```
Arg Pro Gly Pro Gln Pro Thr Ala Glu Thr Thr Arg Gln Phe Leu Met
            180             185                 190
Ser Asp Lys Pro Leu His Leu Glu Ala Ser Leu Asp Lys Glu Ile Tyr
        195             200                 205
Tyr His Gly Glu Pro Ile Ser Val Asn Val His Val Thr Asn Asn Thr
        210             215             220
Asn Lys Thr Val Lys Lys Ile Lys Ile Ser Val Arg Gln Tyr Ala Asp
225             230             235                         240
Ile Cys Leu Phe Asn Thr Ala Gln Tyr Lys Cys Pro Val Ala Met Glu
                245             250                     255
Glu Ala Asp Asp Thr Val Ala Pro Ser Ser Thr Phe Cys Lys Val Tyr
            260             265             270
Thr Leu Thr Pro Phe Leu Ala Asn Asn Arg Glu Lys Arg Gly Leu Ala
        275             280             285
Leu Asp Gly Lys Leu Lys His Glu Asp Ala Asn Leu Ala Ser Ser Thr
        290             295             300
Leu Leu Arg Glu Gly Ala Asn Arg Glu Ile Leu Gly Ile Ile Val Ser
305             310             315                         320
Tyr Lys Val Lys Val Lys Leu Val Val Ser Arg Gly Gly Leu Leu Gly
            325             330             335
Asp Leu Ala Ser Ser Asp Val Ala Val Glu Leu Pro Phe Thr Leu Met
            340             345             350
His Pro Lys Pro Lys Glu Glu Pro His Arg Glu Val Pro Glu Asn
        355             360             365
Glu Thr Pro Val Asp Thr Asn Leu Ile Glu Leu Asp Thr Asn Asp Asp
    370             375             380
Asp Ala Val Phe Glu Asp Phe Ala Ala Gln Arg Leu Lys Gly Met Lys
385             390             395                         400
Asp Asp Lys Glu Glu Glu Glu Asp Gly Thr Gly Ser Pro Gln Leu Asn
            405             410             415
Asn Arg
```